(12) United States Patent
Zhou

(10) Patent No.: US 12,524,139 B2
(45) Date of Patent: *Jan. 13, 2026

(54) IMAGE SHARING METHOD AND ELECTRONIC DEVICE

(71) Applicant: VIVO MOBILE COMMUNICATION CO., LTD., Guangdong (CN)

(72) Inventor: Zhongjian Zhou, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 59 days.

This patent is subject to a terminal disclaimer.

(21) Appl. No.: 18/785,228

(22) Filed: Jul. 26, 2024

(65) Prior Publication Data

US 2024/0385738 A1 Nov. 21, 2024

Related U.S. Application Data

(63) Continuation of application No. 18/373,701, filed on Sep. 27, 2023, now Pat. No. 12,073,068, which is a
(Continued)

(30) Foreign Application Priority Data

Mar. 31, 2021 (CN) .......................... 202110350911.7

(51) Int. Cl.
*G06F 3/04845* (2022.01)
*G06F 3/04842* (2022.01)
(Continued)

(52) U.S. Cl.
CPC ...... *G06F 3/04845* (2013.01); *G06F 3/04842* (2013.01); *G06F 3/0485* (2013.01);
(Continued)

(58) Field of Classification Search
CPC ............ G06F 3/04845; G06F 3/04842; G06F 3/0485; G06F 16/5854; G06F 16/5866;
(Continued)

(56) References Cited

U.S. PATENT DOCUMENTS 11,140,108 B1 10/2021 Lam et al.
12,073,068 B2 * 8/2024 Zhou ................... G06F 3/04845
(Continued)

FOREIGN PATENT DOCUMENTS

CN 106034114 A 10/2016
CN 106598462 A 4/2017
(Continued)

*Primary Examiner* — Ramy M Osman
(74) *Attorney, Agent, or Firm* — The Webb Law Firm

(57) ABSTRACT

An image sharing method includes: in a case that an interface of a target group is displayed, receiving a first input for an identifier of a target image in the interface of the target group; in response to the first input, sending an image download request to a server of the target group, where the image download request is used to request download of the target image, and the image download request includes an identifier of a target contact corresponding to the first electronic device; and receiving a first image sent by the server, and displaying the first image. The first image is an image sent by the server to the first electronic device based on the identifier of the target contact and target image data; and the target image data is sent by a second electronic device to the server.

9 Claims, 14 Drawing Sheets

Related U.S. Application Data continuation of application No. PCT/CN2022/083452, filed on Mar. 28, 2022.

(51) Int. Cl.

| | |
|---|---|
| *G06F 3/0485* | (2022.01) |
| *G06F 16/58* | (2019.01) |
| *G06F 16/583* | (2019.01) |
| *G06T 7/11* | (2017.01) |
| *H04L 51/04* | (2022.01) |
| *H04L 51/10* | (2022.01) |
| *H04L 51/52* | (2022.01) |

(52) U.S. Cl.
CPC ...... *G06F 16/5854* (2019.01); *G06F 16/5866* (2019.01); *G06T 7/11* (2017.01); *H04L 51/04* (2013.01); *H04L 51/10* (2013.01); *H04L 51/52* (2022.05)

(58) Field of Classification Search
CPC . G06T 7/11; G06T 11/60; H04L 51/04; H04L 51/10; H04L 51/52; H04L 67/06; G06Q 50/01

See application file for complete search history.

(56) References Cited

U.S. PATENT DOCUMENTS

| | | | |
|---|---|---|---|
| 2008/0207318 A1 | 8/2008 | Bailey et al. | |
| 2008/0278745 A1 | 11/2008 | Morales et al. | |
| 2009/0016622 A1 | 1/2009 | Itakura | |
| 2011/0264922 A1 | 10/2011 | Beaumont et al. | |
| 2012/0047203 A1* | 2/2012 | Brown | G06Q 30/02 709/203 |
| 2013/0002521 A1 | 1/2013 | Minematsu et al. | |
| 2014/0218385 A1* | 8/2014 | Carmi | G06V 10/25 345/620 |
| 2015/0281748 A1* | 10/2015 | Guo | G06V 20/52 348/143 |
| 2016/0086019 A1 | 3/2016 | Ganong et al. | |
| 2016/0139777 A1* | 5/2016 | Pinho | G06V 10/235 715/771 |
| 2016/0217114 A1* | 7/2016 | Fan | G06F 16/5854 |
| 2016/0342587 A1 | 11/2016 | Bastide et al. | |
| 2017/0076101 A1 | 3/2017 | Kochhar et al. | |
| 2020/0117415 A1 | 4/2020 | Lindblom | |
| 2021/0072880 A1 | 3/2021 | Mathur et al. | |
| 2023/0011368 A1 | 1/2023 | Majid et al. | |
| 2023/0260024 A1 | 8/2023 | Saxena | |
| 2024/0031317 A1 | 1/2024 | Zhou | |
| 2024/0385738 A1* | 11/2024 | Zhou | G06F 3/04845 |

FOREIGN PATENT DOCUMENTS

| | | |
|---|---|---|
| CN | 109889348 A | 6/2019 |
| CN | 111061574 A | 4/2020 |
| CN | 111258420 A | 6/2020 |
| CN | 112165553 A | 1/2021 |
| CN | 112462990 A | 3/2021 |
| CN | 112486388 A | 3/2021 |
| CN | 113179205 A | 7/2021 |
| EP | 0664647 A2 | 7/1995 |
| WO | 2020220873 A1 | 11/2020 |

* cited by examiner

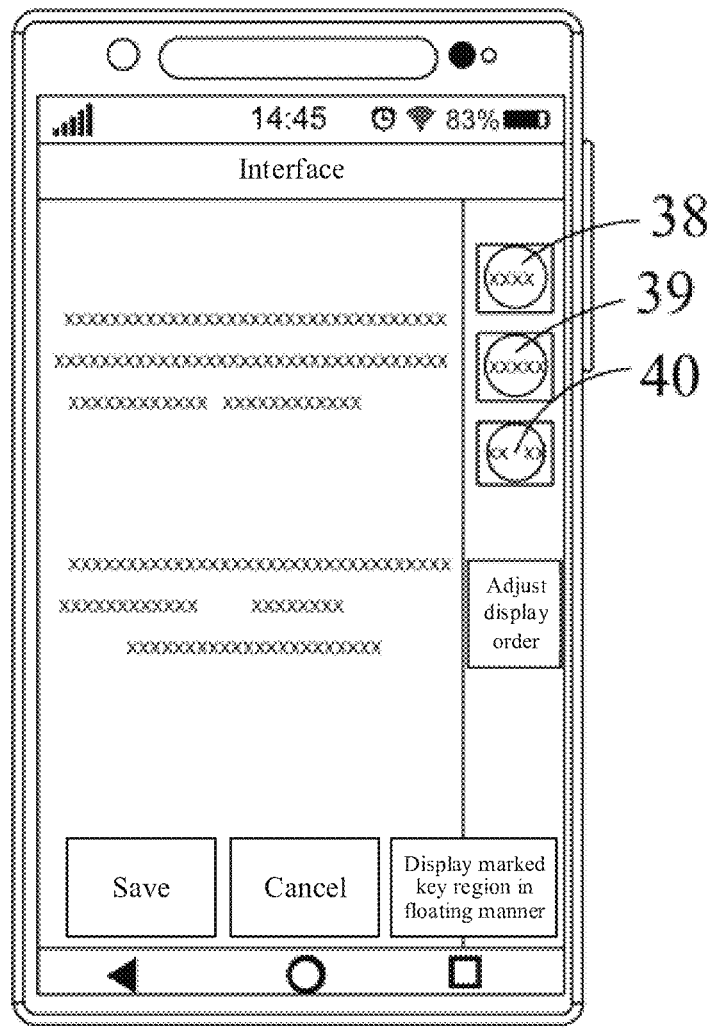

FIG. 10

| In a case that a second image sharing apparatus displays an interface of a target group, the second image sharing apparatus receives a first input of a user for an identifier of a target image in the interface of the target group | — 601 |

↓

| The second image sharing apparatus sends an image download request to a server of the target group in response to the first input | — 602 |

↓

| The second image sharing apparatus receives a first image sent by the server, and displays the first image. | — 603 |

IMAGE SHARING METHOD AND ELECTRONIC DEVICE

CROSS-REFERENCE TO RELATED APPLICATIONS

This application is a Continuation Application of U.S. application Ser. No. 18/373,701 filed on Sep. 27, 2023, which is a Bypass Continuation Application of International Application No. PCT/CN2022/083452 filed on Mar. 28, 2022, which claims priority to Chinese Patent Application No. 202110350911.7 filed on Mar. 31, 2021, the disclosures of which are incorporated herein by reference in their entirety.

TECHNICAL FIELD

This application relates to the field of communication technologies, and in particular, to an image sharing method and apparatus, and an electronic device.

BACKGROUND

Usually, in a scenario in which a user (for example, a user 1) chats in a chat group through a chat application on an electronic device, if the user 1 intends to share a text content 1 with a plurality of users in the chat group, the user 1 may first trigger the electronic device to obtain a picture 1 including the text content 1, and then trigger the electronic device to send the picture 1 through the chat group, so that each of the plurality of users can search the text content 1 in the picture 1 for a text content that the user 1 intends to share, to view the text content that the user 1 intends to share.

SUMMARY

According to a first aspect, an embodiment of this application provides an image sharing method, applied to a second electronic device, where the method includes: receiving a seventh input for a target image, where the target image includes at least a first region and a second region; and in response to the seventh input, sending a second image to a first contact and sending a third image to a second contact; or in response to the seventh input, sending target image data to a server of a target group in a case that a first contact and a second contact belong to the target group, where the second image is generated based on the first region and the third image is generated based on the second region; and the target image data includes an identifier of the first contact, an identifier of the second contact, the second image, and the third image, the identifier of the first contact corresponds to the second image, and the identifier of the second contact corresponds to the third image.

According to a second aspect, an embodiment of this application provides an image sharing method, applied to a first electronic device, where the method includes: in a case that an interface of a target group is displayed, receiving a first input of a user for an identifier of a target image in the interface of the target group; in response to the first input, sending an image download request to a server of the target group, where the image download request is used to request download of the target image, and the image download request includes an identifier of a target contact corresponding to the first electronic device; and receiving a first image sent by the server, and displaying the first image, where the first image is an image sent by the server to the first electronic device based on the identifier of the target contact and target image data; the target image data is sent by a second electronic device to the server, the target image data includes an identifier of a first contact, an identifier of a second contact, a second image, and a third image, the second image is generated based on a first region of the target image, and the third image is generated based on a second region of the target image; and the identifier of the first contact corresponds to the second image, and the identifier of the second contact corresponds to the third image; and the first image includes any one of: the second image or the third image.

According to a third aspect, an embodiment of this application provides an image sharing apparatus, where the image sharing apparatus is a first image sharing apparatus, and the first image sharing apparatus includes a receiving module and a sending module, where the receiving module is configured to receive a seventh input for a target image, and the target image includes at least a first region and a second region; and the sending module is configured to: in response to the seventh input received by the receiving module, send a second image to a first contact and send a third image to a second contact; or in response to the seventh input, send target image data to a server of a target group in a case that a first contact and a second contact belong to the target group, where the second image is generated based on the first region and the third image is generated based on the second region; and the target image data includes an identifier of the first contact, an identifier of the second contact, the second image, and the third image, the identifier of the first contact corresponds to the second image, and the identifier of the second contact corresponds to the third image.

According to a fourth aspect, an embodiment of this application provides an image sharing apparatus, where the image sharing apparatus is a second image sharing apparatus, and the second image sharing apparatus includes a receiving module, a sending module, and a display module, where the receiving module is configured to: in a case that an interface of a target group is displayed, receive a first input of a user for an identifier of a target image in the interface of the target group; the sending module is configured to: in response to the first input received by the receiving module, send an image download request to a server of the target group, where the image download request is used to request download of the target image, and the image download request includes an identifier of a target contact corresponding to the second image sharing apparatus; the receiving module is further configured to receive a first image sent by the server; and the display module is configured to display the first image received by the receiving module, where the first image is an image sent by the server to the first electronic device based on the identifier of the target contact and target image data; the target image data is sent by a second electronic device to the server, the target image data includes an identifier of a first contact, an identifier of a second contact, a second image, and a third image, the second image is generated based on a first region of the target image, and the third image is generated based on a second region of the target image; and the identifier of the first contact corresponds to the second image, and the identifier of the second contact corresponds to the third image; and the first image includes any one of: the second image or the third image.

According to a fifth aspect, an embodiment of this application provides an electronic device, including a processor, a memory, and a program or an instruction stored in the memory and executable on the processor, where when the program or the instruction is executed by the processor, the steps of the method according to the first aspect or the second aspect are implemented.

According to a sixth aspect, an embodiment of this application provides a non-transitory computer-readable storage medium, storing a program or an instruction, where when the program or the instruction is executed by a processor, the steps of the method according to the first aspect or the second aspect are implemented.

According to a seventh aspect, an embodiment of this application provides a chip, including a processor and a communication interface, where the communication interface is coupled to the processor, and the processor is configured to execute a program or an instruction to implement the method according to the first aspect or the second aspect.

BRIEF DESCRIPTION OF THE DRAWINGS

FIG. 10 is a seventh example schematic diagram of an interface of a mobile phone according to an embodiment of this application;

FIG. 11 is a third schematic diagram of an image sharing method according to an embodiment of this application;

DETAILED DESCRIPTION

Figure 1:
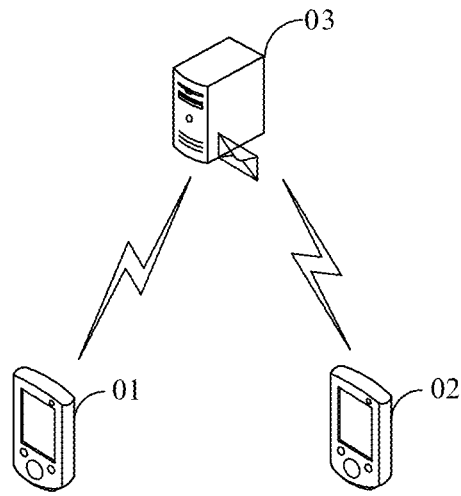
FIG. 1 is a schematic architectural diagram of a communication system according to an embodiment of this application.

The technical solutions in embodiments of this application are clearly described in the following with reference to the accompanying drawings in the embodiments of this application. Apparently, the described embodiments are merely some rather than all of the embodiments of this application. All other embodiments obtained by a person of ordinary skill in the art based on the embodiments of this application shall fall within the protection scope of this application.

In this specification and the claims of this application, the terms "first", "second", and so on are intended to distinguish similar objects, but do not necessarily indicate a specific order or sequence. It should be understood that the data termed in such a way is interchangeable in proper circumstances, so that the embodiments of this application can be implemented in other sequences than the sequence illustrated or described herein. In addition, the objects distinguished by "first", "second", and the like are usually of one type, and there is no limitation on quantities of the objects. For example, there may be one or more first images. In addition, "and/or" in this specification and the claims indicate at least one of the connected objects, and the character "/" usually indicates an "or" relationship between the associated objects.

An image sharing method provided in the embodiments of this application is described in detail below through embodiments and application scenarios thereof with reference to the accompanying drawings.

The image sharing method provided in the embodiments of this application may be applied to a scenario in which users conduct group chats through electronic devices.

It is assumed that a user 1 chats in a chat group 1 through a chat application on an electronic device 1. Usually, if the user 1 intends to share some contents with some users (for example, a user 2 and a user 3) in the chat group 1, for example, intends to share a text content 1 with the user 2 and share a text content 3 with the user 3, the user 1 may first trigger the electronic device 1 to display a page 1. The page 1 includes the text content 1, a text content 2, and the text content 3. Then, the user may trigger the electronic device 1 to perform a screenshot operation on the page 1, so that the electronic device 1 can obtain an image 1. In this way, the user 1 may perform a sharing input for the image 1, so that the electronic device 1 can display an interface of the chat application. The interface of the chat application includes an avatar of the chat group 1. Next, the user 1 may perform a click/tap input on the avatar of the chat group 1, so that the electronic device 1 can send the image 1 to a server of the chat group 1, and then the server can store the image 1 and send a thumbnail message to an electronic device 2 of the user 2 and an electronic device 3 of the user 3. The thumbnail message includes a thumbnail of the image 1. In this way, the electronic device 2 and the electronic device 3 can separately receive the thumbnail message, and display the thumbnail of the image 1 in an interface of the chat group 1. If the user 2 (or the user 3) intends to view the text content that the user 1 intends to share, the user 2 (or the user 3) may perform a click/tap input on the thumbnail of the image 1, so that the electronic device 2 (or the electronic device 3) can send an image download request to the server, and thus the server can send an image message to the electronic device 2 (or the electronic device 3) according to the image download request, where the image message includes the image 1. In this way, the electronic device 2 (or the electronic device 3) can display the image 1 in the interface of the chat group 1, and then the user 2 (or the user 3) can search the text content 1, the text content 2, and the text content 3 in the image 1 for the text content that the user 1 intends to share with the user 2 (or the user 3), that is, the text content 1 (or the text content 3). However, the text contents that the user 1 intends to share with the user 2 and the user 3 may be different. In this case, both the user 2 and the user 3 need to search one by one the text content 1 in the picture 1 for the different text contents that the user 1 intends to share. Consequently, it takes a relatively long time for the user 2 and the user 3 to view the text content that the user 1 intends to share.

However, in a scenario of the embodiments of this application, in a case that the image 1 includes a plurality of image regions (for example, a region 1 and a region 2), the electronic device 1 may send, to the electronic device 2 according to the input of the user for the image 1, an image 2 generated based on the region 1, and send, to the electronic device 3, an image 3 generated based on the region 2.

In another scenario of the embodiments of this application, in a case that the image 1 includes a plurality of image regions (for example, a region 1 and a region 2), the electronic device 1 may send, according to the input of the user for the image 1, image data to the server of the chat group 1. The image data includes account information of the user 2, account information of the user 3, an image 2 generated based on the region 1, and an image 3 generated based on the region 2. In this way, the server can send the image 2 to the electronic device 2 of the user 2 and send the image 3 to the electronic device 3 of the user 3.

It can be understood that, the electronic device 2 (or the electronic device 3) can directly display the image 2 (or the image 3), so that the user 2 (or the user 3) can directly view the text content 1 (or the text content 3) that the user 1 intends to share with the user 2 (or the user 3), without searching one by one for the content that the user 1 intends to share. Therefore, it can take a shorter time for the user 2 and the user 3 to view the content that the user 1 intends to share.

An embodiment of this application provides a communication system. The communication system includes at least a server and a plurality of electronic devices (for example, a first electronic device and a second electronic device). Any two electronic devices transmit messages to each other through the server. For example, the second electronic device intends to send a message (for example, an image message) to the first electronic device. In this case, the second electronic device may directly send the image message to the first electronic device, so that the first electronic device can display an image in the image message; or the second electronic device may first send the image message to the server, so that the server can store an image in the image message, and send an image identifier message to the first electronic device. The image identifier message includes an identifier (for example, a thumbnail) of the image. In this way, the first electronic device can display the thumbnail. If a user 2 of the first electronic device intends to view the image, the user 2 may click/tap the thumbnail, so that the first electronic device can send an image download request to the server. In this way, the server can send the image message to the first electronic device according to the image download request, so that the first electronic device can display the image in the image message.

As shown in FIG. 1, the communication system provided in this embodiment of this application includes a second electronic device 01, a first electronic device 02, and a server 03.

The second electronic device 01 receives a seventh input for a target image, where the target image includes at least a first region and a second region; and in response to the seventh input, sends target image data to the server of a target group in a case that a first contact and a second contact belong to the target group. A second image is generated based on the first region and a third image is generated based on the second region. The target image data includes an identifier of the first contact, an identifier of the second contact, the second image, and the third image. The identifier of the first contact corresponds to the second image. The identifier of the second contact corresponds to the third image. In this way, the server 03 can store the target image data, and sends an image identifier message to the first electronic device 02. The image identifier message includes an identifier of the target image. Therefore, the first electronic device can display the identifier of the target image in an interface of the target group. In addition, in a case that the first electronic device 02 displays the interface of the target group, the first electronic device 02 receives a first input of a user for the identifier of the target image in the interface of the target group; and in response to the first input, sends an image download request to the server 03 of the target group. The image download request is used to request download of the target image. The image download request includes an identifier of a target contact corresponding to the first electronic device 02. In this way, the server 03 can send a first image to the first electronic device 02 according to the image download request, and then the first electronic device 02 receives the first image sent by the server 03 and displays the first image. The first image is an image sent by the server to the first electronic device based on the identifier of the target contact and the target image data. The first image includes any one of: the second image or the third image.

In the communication system provided in this embodiment of this application, the second electronic device can send, to the server according to the seventh input of the user for the target image, identifiers of some contacts and images including a content that the user intends to share. Therefore, the server can send, to electronic devices (for example, the first electronic device) of some contacts with whom the user intends to share a content in the target group, the images including the content that the user intends to share, and send the third image to electronic devices of some other contents with whom the user intends to share a content in the target group, rather than sending the target image to electronic devices of all contacts in the target group. In this way, some contacts with whom the user intends to share a content do not need to search one by one for the content that the user intends to share, so that contents can be more conveniently shared.

Optionally, in this embodiment of this application, in a case that both the first contact and the second contact include a third contact, the target image data further includes a fourth image, and the first image includes any one of: the second image, the third image, or the fourth image. An identifier of the third contact corresponds to the fourth image, and the fourth image is generated based on the first region and the second region.

It can be learned that, because the first electronic device can display the fourth image in a case that both the first contact and the second contact include the third contact, that is, the first electronic device can display the image that the user intends to share of the second electronic device, images that the second electronic device intends to share can be more diversified.

Optionally, in this embodiment of this application, the target image data further includes: the target image. In a case that the identifier of the target contact matches the identifier of the first contact, the first image is the second image. In a case that the identifier of the target contact matches the identifier of the second contact, the first image is the third image. In a case that the identifier of the target contact matches the identifier of the third contact, the first image is the fourth image. In a case that the identifier of the target contact matches neither the identifier of the first contact nor the identifier of the second contact, the first image is the target image.

Optionally, in this embodiment of this application, before the "sending target image data to the server of a target group", the second electronic device 01 associates the first region with the first contact, associates the second region with the second contact, and associates both the first region and the second region with the third contact.

It can be learned that, because the second electronic device can associate the first region with the first contact, associate the second region with the second contact, and associate both the first region and the second region with the third contact, the second electronic device can send different images to different contacts according to different sharing requirements of users. Therefore, images that the second electronic device intends to share can be more diversified, thereby improving user experience.

Optionally, in this embodiment of this application, before the "receiving, by the second electronic device 01, a seventh input for a target image", the second electronic device 01 receives a second input for the target image in a case that the second electronic device 01 displays the target image; and in response to the second input, divides the target image into the first region and the second region according to an input parameter of the second input.

It can be learned that, because the second electronic device can divide, according to an input of the user, the target image into different regions including different contents, to enable the second electronic device to generate, according to the different regions, different images including different contents and required by the user, to accurately send, to different contacts, the different images including different contents and required by the user, accuracy of the second electronic device in sharing the content that the user intends to share can be improved.

Optionally, in this embodiment of this application, before the "sending target image data to the server of a target group", the second electronic device 01 displays an image editing interface, where the image editing interface includes the target image. The second electronic device 01 receives a third input of a user for a target region of the target image, where the target region includes at least one of: the first region or the second region; displays at least one first control in response to the third input, where each first control corresponds to one image processing manner; receives a fourth input of the user for a target control in the at least one first control; and in response to the fourth input, performs image processing on the target region in an image processing manner corresponding to the target control.

It can be learned that, because the user may intend to share contents having different visual effects with different contacts in some contacts in the target group, the user can trigger the second electronic device to perform the foregoing step, to enable the server to send images including the content having the different visual effects to the different contacts, that is, on different electronic devices of the different contacts, visual effects of images displayed are all different, but not images having a same visual effect (that is, target images) are all displayed. Therefore, the second electronic device can share contents more flexibly.

Optionally, in this embodiment of this application, before the "receiving, by the second electronic device 01, a seventh input for a target image", the second electronic device 01 receives a fifth input for M sub-regions of a third region, where the third region is the first region or the second region, and M is a positive integer; and in response to the fifth input, generates M sub-images based on the M sub-regions and displays the M sub-images, where each sub-region corresponds to one sub-image.

It can be learned that, because the second electronic device can display the M sub-images on the target image according to the input of the user in the M sub-regions of the third region, another contact can directly view the M sub-images to rapidly view the content that the user intends to share. Therefore, efficiency of content sharing by the second electronic device can be improved.

Optionally, in this embodiment of this application, the "displaying the M sub-images" includes: The second electronic device 01 reduces a display size of the target image, and displays the M sub-images in a display region adjacent to a display region of the target image.

It can be learned that, because the second electronic device can reduce the display size of the target image to display the M sub-images in the display region adjacent to the display region of the target image, a case that the M sub-images block the content in the target image can be avoided. In this way, efficiency of content sharing by the second electronic device can be improved, and therefore, user experience can be improved.

Optionally, in this embodiment of this application, after the "displaying the M sub-images", the second electronic device 01 receives a sixth input for dragging a target sub-image in the M sub-images to a target location; and in response to the sixth input, based on the target location, adjusts a display region of the target sub-image and adjusts display regions of N sub-images in the M sub-images, where N is a positive integer. The N sub-images are determined based on the display region of the target sub-image and the target location.

It can be learned that, the user can perform the sixth input for the target sub-image to enable the second electronic device to adjust the display regions of the N sub-images, to adjust a display order (logical order) of the N sub-images. Therefore, image viewing experience of the user (that is, the user or the user of the electronic device) can be improved.

Figure 2:
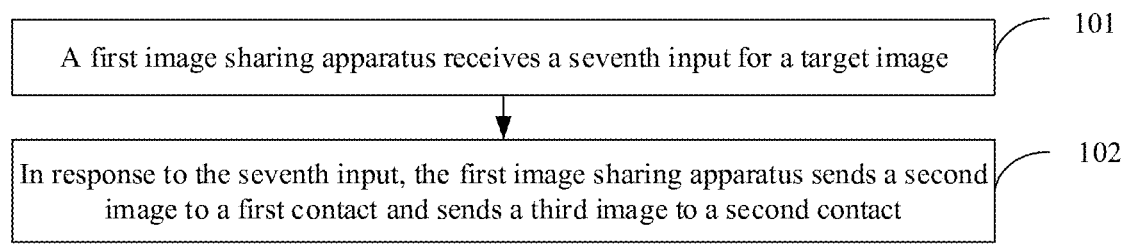
FIG. 2 is a first schematic diagram of an image sharing method according to an embodiment of this application.

An embodiment of this application provides an image sharing method, and the image sharing method can be applied to a first image sharing apparatus. FIG. 2 is a flowchart of an image sharing method according to an embodiment of this application. As shown in FIG. 2, the image sharing method provided in this embodiment of this application may include the following step 101 and step 102.

Step 101. A first image sharing apparatus receives a seventh input for a target image.

Optionally, in this embodiment of this application, in a case that the first image sharing apparatus displays the target image and the target image includes M regions, the first image sharing apparatus receives a seventh input of a user 1 for the target image, where M is an integer greater than 1.

In this embodiment of this application, the target image includes at least a first region and a second region.

It can be understood that, the M regions include the first region and the second region.

Optionally, in a scenario, in a case that the first image sharing apparatus, a third image sharing apparatus, and a fourth image sharing apparatus are connected through a first network and a first page of a first application is displayed, the first image sharing apparatus can perform a screenshot operation on the first page according to a screenshot input of the user 1 to obtain the target image. Then, the first image sharing apparatus can establish an association relationship between the first region and a first contact and establish an association relationship between the second region and a second contact according to an input of the user 1 for the first region (and the second region) of the target image, so that the seventh input can be performed. The third image sharing apparatus is an image sharing apparatus of the first contact. The fourth image sharing apparatus is an image sharing apparatus of the second contact.

Optionally, in another scenario, in a case that a first page of a first application is displayed, the first image sharing apparatus can perform a screenshot operation on the first page according to a screenshot input of the user 1 to obtain the target image. Then, the first image sharing apparatus can display an interface of a target application according to a sharing input of the user 1 for the target image and an identifier (for example, an icon) of the target application. The interface of the target application includes an identifier of at least one group. In this way, the first image sharing apparatus can select a target group according to a select input (for example, a click/tap input) of the user 1 for an identifier of the target group in the identifier of the at least one group, and switch the interface of the target application to a first interface. The first interface includes the target image. Then, the first image sharing apparatus can establish an association relationship between the first region and a first contact and establish an association relationship between the second region and a third contact according to an input of the user 1 for the first region (and the second region) of the target image, so that the seventh input can be performed.

Optionally, in this embodiment of this application, the first network may be: a wireless fidelity (WiFi) network, a Bluetooth network, or the like.

Optionally, in this embodiment of this application, an application type of the first application may include any one of: a chat application, a web application, a short video interactive application, a live streaming application, a filming application, and the like.

It can be understood that, the first page may be a page including all contents that the user 1 intends to share, and the target image includes all the contents that the user 1 intends to share. The content may include at least one of: a text content, an image content, or the like.

Optionally, in this embodiment of this application, an application type of the target application may be a chat application.

Optionally, in this embodiment of this application, the identifier of the at least one group may include at least one of: an icon, a name, a link, or the like.

Optionally, in this embodiment of this application, the M regions may be regions obtained by the first image sharing apparatus by performing an image division operation on the target image according to the content in the target image; or regions obtained by the first image sharing apparatus by performing an image division operation on the target image according to the input of the user 1.

Optionally, in this embodiment of this application, after the first image sharing apparatus switches the interface of the target application to the first interface, the first image sharing apparatus may detect the target image to obtain all the contents that the user 1 intends to share, so that the first image sharing apparatus can divide the target image into the M regions according to all the contents.

For example, in this embodiment of this application, in a case that the content includes a text content, the first image sharing apparatus may divide the text content into M text sub-contents according to semantic features of the text content, and divide the target image into the M regions according to regions corresponding to the M text sub-contents. One region corresponds to one text sub-content.

Optionally, in this embodiment of this application, after the first image sharing apparatus switches the interface of the target application to the first interface, the first image sharing apparatus may divide the target image into the M regions according to an input parameter of an input (for example, a second input in the following embodiment) of the user 1.

Optionally, in this embodiment of this application, the input parameter may include at least one of: an input track, an input direction, or the like.

Optionally, in this embodiment of this application, the first input may be a press input (for example, a click/tap input or a long-press input) of the user 1 for a display screen of the first image sharing apparatus, or a press input of the user 1 for a physical button of the first image sharing apparatus. Certainly, the seventh input may alternatively be another form of input of the user 1. This is not limited in this embodiment of this application.

Optionally, in this embodiment of this application, the first interface further includes a "send" control, and the seventh input may be a click/tap input of the user 1 for the "send" control.

Step 102. In response to the seventh input, the first image sharing apparatus sends a second image to a first contact and sends a third image to a second contact.

Optionally, in this embodiment of this application, the first image sharing apparatus may first generate a second image and a third image, and then send the second image to the first contact and send the third image to the second contact.

In this embodiment of this application, the second image is generated based on the first region and the third image is generated based on the second region.

Optionally, in this embodiment of this application, the first image sharing apparatus may first perform image processing on the first region, and then generate a second image according to the first region and the second region after image processing.

Optionally, in this embodiment of this application, the image processing may include at least one of: "brush" image processing, "crop" image processing, blur image processing, display parameter adjustment processing, or the like.

It should be noted that, the "brush" image processing may be understood as image processing in which the user 1 may perform a sliding input on an image to trigger the image sharing apparatus to display a pattern corresponding to an input track of the sliding input. The "crop" image processing may be understood as image processing in which the first image sharing apparatus may crop the target image to obtain a target region.

For example, in this embodiment of this application, after the first image sharing apparatus performs image processing on the target region by using the "crop" image processing, the first image sharing apparatus can directly generate the second image according to the target region; or the first image sharing apparatus can stitch the target region with a blank region to generate the second image. A display size of the blank region is the same as a display size of another region. The another region is a region in the target image other than the target region.

It can be understood that, a display size of the second image generated by the first image sharing apparatus by stitching the target region with the blank region is the same as a display size of the target image.

Optionally, in this embodiment of this application, the display parameter may include at least one of: a display size, a display brightness value, a contrast value, a color difference value, a color temperature value, or the like.

Optionally, in this embodiment of this application, the first image sharing apparatus may first perform image processing on the second region, and then generate a third image according to the second region and the first region after image processing.

Optionally, in this embodiment of this application, the first image sharing apparatus may send the second image to the first contact through a first network, and send the third image to the second contact through a second network.

Figure 3:
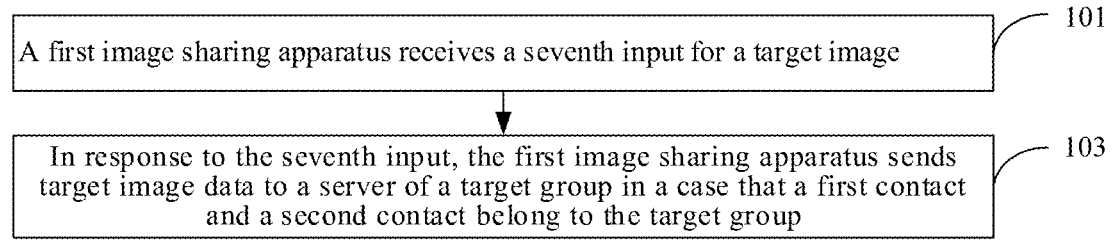
FIG. 3 is a second schematic diagram of an image sharing method according to an embodiment of this application.

Optionally, in this embodiment of this application, with reference to FIG. 2, as shown in FIG. 3, step 102 may also be replaced with step 103.

Step 103. In response to the seventh input, the first image sharing apparatus sends target image data to a server of a target group in a case that a first contact and a second contact belong to the target group.

Optionally, in this embodiment of this application, the first image sharing apparatus may first generate a second image and a third image, and then send the second image to the first contact and send the third image to the second contact.

In this embodiment of this application, the second image is generated based on the first region and the third image is generated based on the second region.

It should be noted that, for the description of generating a second image and a third image by the first image sharing apparatus, refer to the description in the foregoing embodiment. Details are not described herein again in this embodiment of this application.

In this embodiment of this application, the target image data includes an identifier of the first contact, an identifier of the second contact, the second image, and the third image. The identifier of the first contact corresponds to the second image. The identifier of the second contact corresponds to the third image.

Optionally, in this embodiment of this application, after the first image sharing apparatus sends the target image data to the server of the target group, an image sharing apparatus of another contact may send an image download request to the server, and the image download request includes an identifier of the another contact. In this way, the server can send the second image (or the third image) to the image sharing apparatus of the another contact according to the identifier of the another contact.

It can be understood that, in a case that the identifier of the another contact matches (for example, is the same as) the identifier of the first contact, the server may send the second image to the image sharing apparatus of the another contact. In a case that the identifier of the another contact matches (for example, is the same as) the identifier of the second contact, the server may send the third image to the image sharing apparatus of the another contact. In a case that the identifier of the another contact does not match (for example, is not the same as) the identifier of the first contact (and that of the second contact), the server may send another image to the image sharing apparatus of the another contact.

Optionally, in this embodiment of this application, the another image may be an image pre-stored in the server, or may be an image (for example, the target image in the following embodiment) in the target image data.

In this embodiment of this application, if the user 1 intends to share some contents with some contacts, the user 1 may trigger the first image sharing apparatus to perform a screenshot operation in a case that the first image sharing apparatus displays the some contents, to obtain an image including the some contents. However, the user 1 may intend to share different contents in the some contents with different contacts. Therefore, the user 1 may trigger the first image sharing apparatus to perform the foregoing step 101 and step 102 (or step 103) to send different images including the different contents in the some contents to the different contacts, that is, different image sharing apparatuses of different contacts display different contents of images.

According to the image sharing method provided in the embodiments of this application, the first image sharing apparatus may, according to a seventh input for a target image (where the target image includes a first region and a second region), send a second image generated based on the first region to a first contact, and send a third image generated based on the second region to a second contact; or send target image data to a server of a target group in a case that a first contact and a second contact belong to the target group, where the target image data includes an identifier of the first contact, an identifier of the second contact, the second image corresponding to the identifier of the first contact, and the third image corresponding to the identifier of the second contact, so that the server can, according to the target image data, send the corresponding second image to the first contact and send the corresponding third image to the second contact. The first image sharing apparatus can, according to the seventh input, send, to the first contact, the second image including a content that a user intends to share with the first contact, and send, to the second contact, the third image including a content that the user intends to share with the second contact; or send the target image data to the server of the target group, so that the server can, according to the target image data, send, to the first contact, the second image including the content that the user intends to share with the first contact, and send, to the second contact, the third image including the content that the user intends to share with the second contact. Therefore, the first contact (or the second contact) can directly view, from the second image (or the third image), the content that the user intends to share with the first contact (or the second contact), without searching one by one all contents in the target image for the content that the user intends to share with the first contact (or the second contact). Therefore, it can take a shorter time for each contact to view the content that the user intends to share. In this way, contents can be more conveniently shared by the first image sharing apparatus.

Certainly, a case in which both the first contact and the second contact include a particular contact may occur. In this case, the first image sharing apparatus may send another image to the particular contact.

Optionally, in this embodiment of this application, both the first contact and the second contact include a third contact. For example, step 102 may be implemented through the following step 102a.

Step 102a. In response to the seventh input, the first image sharing apparatus sends a second image to a first contact, sends a third image to a second contact, and sends a fourth image to a third contact.

Optionally, in this embodiment of this application, the fourth image is generated based on the first region and the second region.

For example, in this embodiment of this application, the fourth image is generated according to the first region after image processing and the second region after image processing.

In this embodiment of this application, if both the first contact and the second contact include the third contact, it can be considered that the user 1 may intend to share all contents in the target image with the third contact. Therefore, the first image sharing apparatus may send the fourth image to the third contact.

It can be learned that, because in a case that both the first contact and the second contact include the third contact, the first image sharing apparatus can send the second image to the first contact, send the third image to the second contact, and send the fourth image to the third contact, that is, the first image sharing apparatus can send different images to different contacts according to different sharing requirements of users, images that the first image sharing apparatus intends to share can be more diversified.

Optionally, in this embodiment of this application, in a case that both the first contact and the second contact include a third contact, the target image data further includes a fourth image, and an identifier of the third contact corresponds to the fourth image.

It can be understood that, when an image sharing apparatus of the third contact sends an image download request (the image download request includes the identifier of the third contact) to the server, the server may send the fourth image to the image sharing apparatus of the third contact according to the identifier of the third contact.

How the first image sharing apparatus divides the target image into a first region and a second region according to an input of the user 1 is to be described below by way of example.

Optionally, in this embodiment of this application, before step 101, the image sharing method provided in this embodiment of this application may further include the following step 201 and step 202.

Step 201. The first image sharing apparatus receives a second input for the target image in a case that the target image is displayed.

Optionally, in this embodiment of this application, the first image sharing apparatus may switch the interface of the target application to a first interface (the first interface includes the target image), and control the target image to be in an editable state, so that the second input can be performed for the target image.

It should be noted that, the "editable state" can be understood as a case in which the target image is in a state that it can be edited. For example, the user 1 may trigger the image sharing apparatus to perform a division operation, an image processing operation, or the like on the target image.

For example, in this embodiment of this application, the first interface may further include prompt information, and the prompt information is used to prompt the user 1 that the target image is in the editable state.

Figure 4:
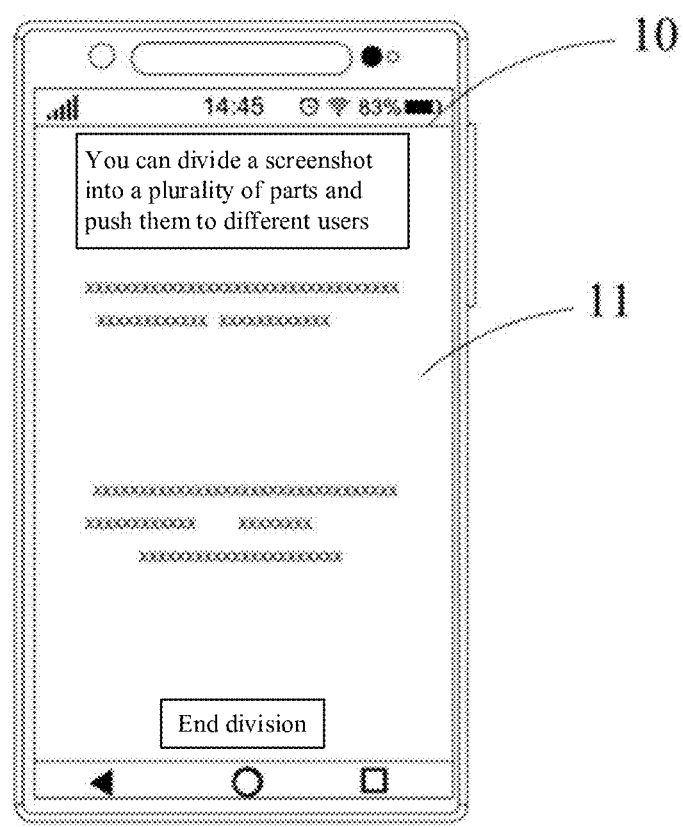
FIG. 4 is a first example schematic diagram of an interface of a mobile phone according to an embodiment of this application.

That the first image sharing apparatus is a mobile phone is used as an example for description. As shown in FIG. 4, the mobile phone may switch the interface of the target application to the first interface (for example, an interface 10), the interface 10 displays the target image (for example, an image 11), the image 11 is in the editable state, and the interface 10 further includes prompt information (for example, prompt information reading "You can divide a screenshot into a plurality of parts and push them to different users"), so that the second input can be performed.

Optionally, in this embodiment of this application, the second input may be a sliding input of the user 1 on a display screen.

For example, in this embodiment of this application, the second input may be a sliding input of the user 1 on the display screen from one edge line of the display screen to another edge line. The one edge line and the another edge line may be adjacent edge lines or non-adjacent edge lines.

Step 202. The first image sharing apparatus divides the target image into a first region and a second region according to an input parameter of the second input in response to the second input.

Optionally, in this embodiment of this application, the input parameter of the second input may be an input track.

Optionally, in this embodiment of this application, the first image sharing apparatus may respectively determine the first region and the second region according to a region enclosed by the input track of the second input and the edge line of the display screen.

Figure 5A:
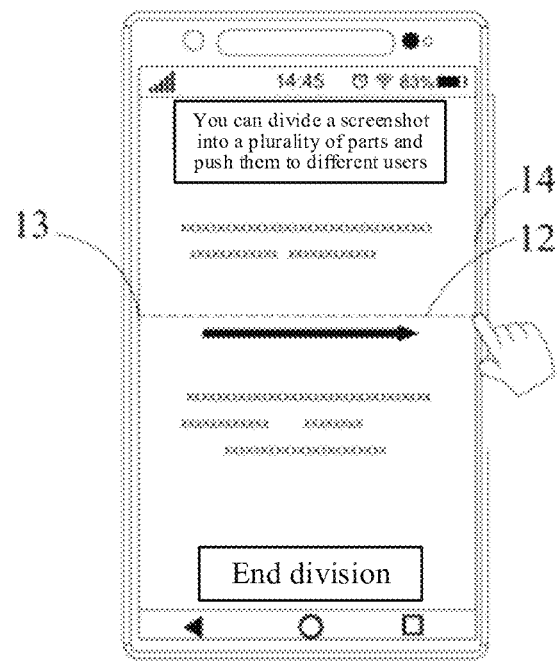
FIGS. 5A-5B are second example schematic diagrams of an interface of a mobile phone according to an embodiment of this application.
Figure 5B:
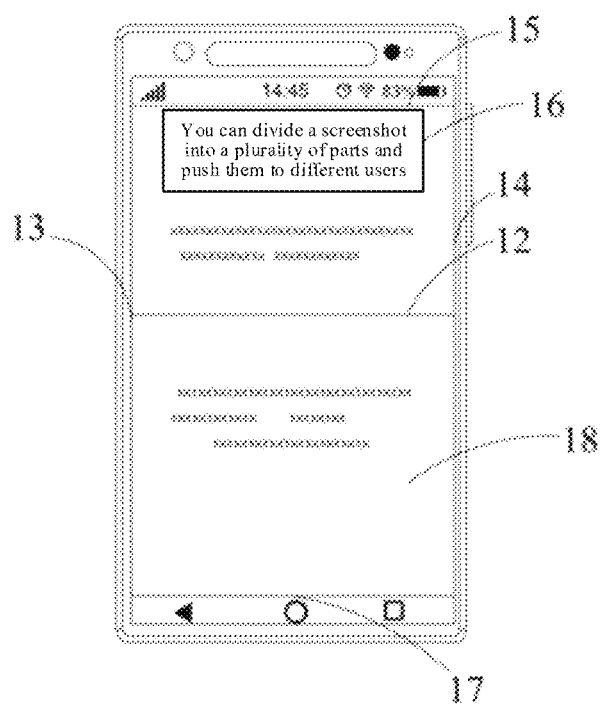

For example, with reference to FIG. 4, as shown in FIG. 5A, the user 1 may perform the second input (for example, a sliding input 12) on the display screen, where the second input is a sliding input from one edge line (for example, an edge line 13) of the display screen to another edge line (for example, an edge line 14), so that a mobile phone can divide the image 11 into a first region and a second region. As shown in FIG. 5B, after the user 1 performs the second input, the mobile phone may determine a region (for example, a region 16) enclosed by an input track of the sliding input 12, the edge line 13, the edge line 14, and one edge line (for example, an edge line 15) of the display screen as a first region, and determine a region (for example, a region 18) enclosed by the input track of the sliding input 12, the edge line 13, the edge line 14, and another edge line (for example, an edge line 17) of the display screen as a second region, to divide the image 11 into the first region (that is, the region 16) and the second region (that is, the region 18).

In this embodiment of this application, when the user 1 intends to share different contents in some contents with different contacts, the user 1 may perform an input according to a usage requirement of the user 1, so that the first image sharing apparatus can divide the target image into different regions including different contents. In this case, the user 1 can trigger the first image sharing apparatus to send different images respectively corresponding to the different regions to different contacts (or servers), to send different images including the different contents in the some contents to the different contacts.

It can be learned that, because the first image sharing apparatus can divide, according to an input of the user, the target image into different regions including different contents, to enable the first image sharing apparatus to generate, according to the different regions, different images including different contents and required by the user, to accurately send, to different contacts, the different images including different contents and required by the user, accuracy of the first image sharing apparatus in sharing the content that the user intends to share can be improved.

How the first image sharing apparatus performs image processing on the first region and the second region is to be described below by way of example.

Optionally, in this embodiment of this application, before the "sending a second image to a first contact, sending a third image to a second contact, and sending a fourth image to a third contact" in step 102a, or before the "sending target image data to a server of a target group in a case that a first contact and a second contact belong to the target group" in step 103, the image sharing method provided in this embodiment of this application may further include the following step 301 to step 305.

Step 301. The first image sharing apparatus displays an image editing interface in response to the seventh input.

Optionally, in this embodiment of this application, in a case that a first interface is displayed and the first interface includes an "image editing" control, the first image sharing apparatus may switch the first interface to an image editing interface according to a click/tap input of the user 1 for the "image editing" control, to display the image editing interface.

In this embodiment of this application, the image editing interface includes the target image.

Step 302. The first image sharing apparatus receives a third input of a user for a target region of the target image.

In this embodiment of this application, the target region includes at least one of: the first region or the second region.

Optionally, in this embodiment of this application, the third input may be a press input (for example, a long-press input) of the user 1 for the target region.

Step 303. The first image sharing apparatus displays at least one first control in response to the third input.

In this embodiment of this application, each of the at least one first control corresponds to one image processing manner.

Optionally, in this embodiment of this application, the image processing manner includes at least one of "brush" image processing, "crop" image processing, blur image processing, display parameter adjustment processing, or the like.

It should be noted that, for descriptions of the "brush" image processing and the "crop" image processing, refer to the description in the foregoing embodiment. Details are not described herein again in this embodiment of this application.

Optionally, in this embodiment of this application, the first image sharing apparatus may display the at least one first control in a floating manner on the target region.

Step 304. The first image sharing apparatus receives a fourth input of the user for a target control in the at least one first control.

In this embodiment of this application, the fourth input is used to trigger the first image sharing apparatus to perform image processing on the target region.

Optionally, in this embodiment of this application, the fourth input may be a click/tap input of the user 1 for the target control.

Step 305. The first image sharing apparatus performs image processing on the target region in an image processing manner corresponding to the target control in response to the fourth input.

It can be learned that, because the first image sharing apparatus can display at least one first control according to the third input of the user for the target region in a case that the image editing interface is displayed, and perform, according to the fourth input of the user for the target control, image processing on the target region in the image processing manner corresponding to the target control, the user can share, with some contacts in the target group, contents obtained after the image processing. Therefore, a display effect of the content shared by the first image sharing apparatus can be improved, thereby improving user experience.

Optionally, in this embodiment of this application, the target image data further includes the target image. In a case that the target region is the first region, both the second image and the fourth image are generated according to the first region after image processing. In a case that the target region is the second region, both the third image and the fourth image are generated according to the second region after image processing.

It can be understood that, in a case that the target region is the first region, both the second image and the fourth image are generated according to the first region and the second region after image processing. In a case that the target region is the second region, both the third image and the fourth image are generated according to the second region and the first region after image processing.

For example, in this embodiment of this application, the first image sharing apparatus may perform image stitching on the first region and the second region after image processing, to generate a second image (or a fourth image); or the first image sharing apparatus may perform image stitching on the second region and the first region after image processing, to generate a third image (or a fourth image).

In this embodiment of this application, the target image is an image sent to another contact, or an image displayed on an image sharing apparatus of another contact. The another contact is a contact in the target group other than the first contact and the second contact.

It can be understood that, the first image sharing apparatus may send the target image data to the server, so that in a case that an image sharing apparatus of the first contact sends an image download request to the server, the server can send the second image to the image sharing apparatus of the first contact according to the image download request; or in a case that an image sharing apparatus of the second contact sends an image download request to the server, the server can send the third image to the image sharing apparatus of the second contact according to the image download request.

Optionally, in this embodiment of this application, in a case that the target region includes the first region and the second region, the second image is generated according to the first region after image processing, the third image is generated according to the second region after image processing, and the fourth image is generated according to the first region after image processing and the second region after image processing.

It can be understood that, in a case that an image sharing apparatus of the third contact sends an image download request to the server, the server can send the fourth image to the image sharing apparatus of the third contact according to the image download request.

It can be learned that, because the user may intend to share contents having different visual effects with different contacts in some contacts in the target group, the user can trigger the first image sharing apparatus to perform the foregoing step, to enable the server to send images including the content having the different visual effects to the different contacts, that is, on different image sharing apparatuses of the different contacts, visual effects of images displayed are all different, but not images having a same visual effect (that is, target images) are all displayed. Therefore, the first image sharing apparatus can share contents more flexibly.

How the first image sharing apparatus associates a region with a contact is to be described below by way of example.

Optionally, in this embodiment of this application, before the "sending a second image to a first contact, sending a third image to a second contact, and sending a fourth image to a third contact" in step 102a, or before the "sending target image data to a server of a target group in a case that a first contact and a second contact belong to the target group" in step 103, the image sharing method provided in this embodiment of this application may further include the following step 401.

Step 401. In response to the seventh input, the first image sharing apparatus associates the first region with the first contact, associates the second region with the second contact, and associates both the first region and the second region with the third contact.

Optionally, in this embodiment of this application, in response to the seventh input, the first image sharing apparatus may display identifiers of X contacts in the first region, and display identifiers of Y contacts in the second region, so that the user can perform an input for an identifier of the first contact in the identifiers of the X contacts and for an identifier of the second contact in the identifiers of the Y contacts, to enable the first image sharing apparatus to associate the first region with the first contact, associate the second region with the second contact, and associate both the first region and the second region with the third contact. X and Y are both positive integers.

For example, in this embodiment of this application, each of the X contacts is a contact in the target group; and each of the Y contacts is a contact in the target group.

For example, in this embodiment of this application, the identifiers of the X contacts may include at least one of: avatars, names, or the like. The identifiers of the Y contacts may include at least one of: avatars, names, or the like.

For example, in this embodiment of this application, the X contacts may be the same as the Y contacts. It can be understood that X=Y.

For example, in this embodiment of this application, the first image sharing apparatus may detect the target group to obtain identifiers of all contacts in the target group, so that the first image sharing apparatus can display a window in the first region (or the second region), where the window includes the identifiers of the X contacts (or the Y contacts) in the identifiers of all the contacts, to display the identifiers of the X contacts (or the Y contacts).

Figure 6:
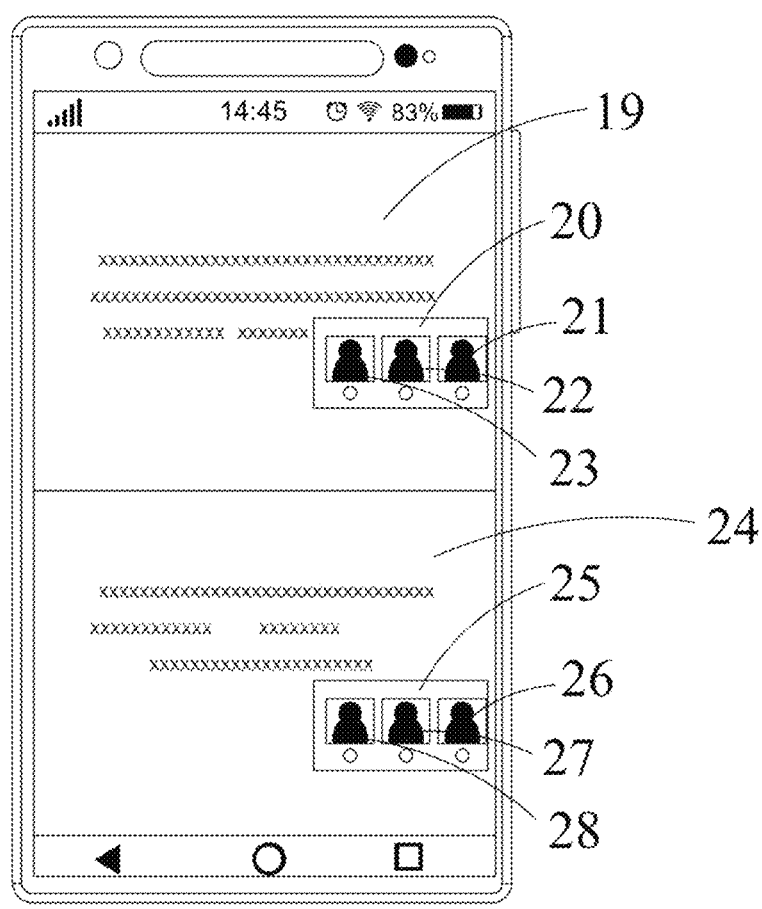
FIG. 6 is a third example schematic diagram of an interface of a mobile phone according to an embodiment of this application.

For example, as shown in FIG. 6, a mobile phone may display a window (for example, a window 20) in the first region (for example, a region 19) in a floating manner, where the window 19 includes the identifiers of the X contacts (for example, an identifier 21 of a contact 1, an identifier 22 of a contact 2, and an identifier 23 of a contact 3), and display another window (for example, a window 25) in the second region (for example, a region 24) in a floating manner, where the window 25 includes the identifiers of the Y contacts (for example, an identifier 26 of a contact 1, an identifier 27 of a contact 2, and an identifier 28 of a contact 3).

For example, in this embodiment of this application, the user 1 may perform a click/tap input for the identifier of the first contact in the identifiers of the X contacts, so that the first image sharing apparatus can associate the first region with the first contact; and perform a click/tap input for the identifier of the second contact in the identifiers of the Y contacts, so that the first image sharing apparatus can associate the second region with the second contact and associate both the first region and the second region with the third contact.

Figure 7A:
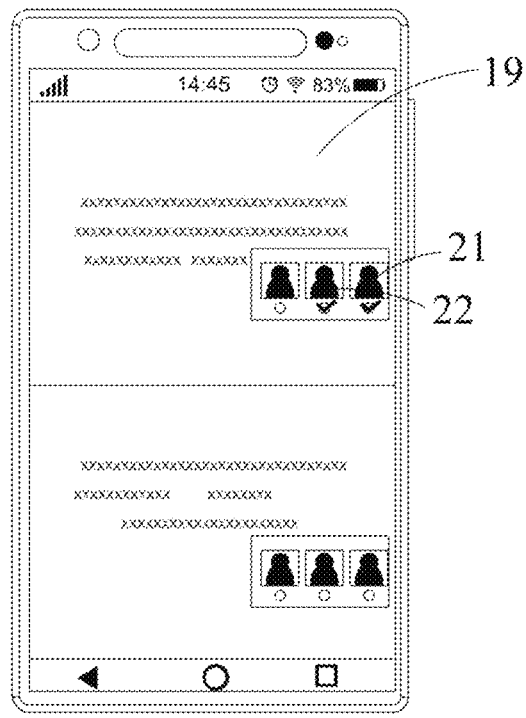
FIGS. 7A-7B are fourth example schematic diagrams of an interface of a mobile phone according to an embodiment of this application.
Figure 7B:
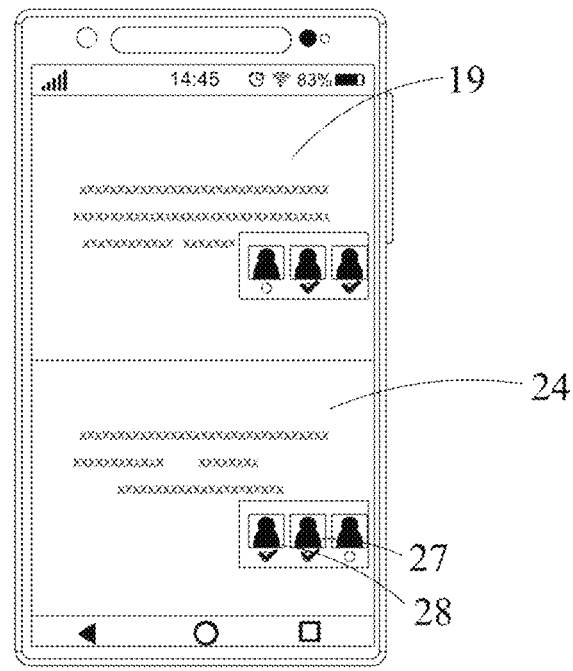

For example, with reference to FIG. 6, as shown in FIG. 7A, the user 1 may perform a click/tap input for the identifier of the first contact (for example, the identifier 21 of the contact 1 and the identifier 22 of the contact 2) in the identifier 21 of the contact 1, the identifier 22 of the contact 2, and the identifier 23 of the contact 3, so that the mobile phone can associate the region 19 with the contact 1 and the contact 2. As shown in FIG. 7B, after the mobile phone associates the region 19 with the contact 1 and the contact 2, the user 1 may perform a click/tap input for the identifier of the second contact (for example, the identifier 27 of the contact 2 and the identifier 28 of the contact 3) in the identifier 26 of the contact 1, the identifier 27 of the contact 2, and the identifier 28 of the contact 3, so that the mobile phone can associate the region 24 with the contact 2 and the contact 3 and associate both the region 19 and the region 24 with the contact 2.

It can be learned that, because the first image sharing apparatus can associate the first region with the first contact, associate the second region with the second contact, and associate both the first region and the second region with the third contact, the first image sharing apparatus can send different images to different contacts according to different sharing requirements of users. Therefore, images that the first image sharing apparatus intends to share can be more diversified, thereby improving user experience.

Usually, to enable some contacts to rapidly view the content that the user 1 intends to share, the user 1 may add a marker element to the target image, and send, to the some contacts (or servers), the target image to which the marker element has been added. However, a case in which the marker element blocks the content in the target image to which the marker element has been added may occur. Some contacts may not be capable of completely viewing the content that the user 1 intends to share.

In this way, in this embodiment of this application, after the user 1 adds the marker element to the target image, the first image sharing apparatus may display, on the target image, a sub-image corresponding to the marker element added by the user 1, and delete the marker element added by the target image, thereby avoiding occurrence of the case in which the marker element blocks the content in the target image to which the marker element has been added.

Optionally, in this embodiment of this application, before step 101, the image sharing method provided in this embodiment of this application may further include the following step 501 and step 502.

Step 501. The first image sharing apparatus receives a fifth input for M sub-regions of a third region.

Optionally, in this embodiment of this application, in a case that the first image sharing apparatus displays a target image and the target image is in an editable state, the user 1 may perform the fifth input for the M sub-regions of the third region.

Optionally, in this embodiment of this application, the fifth input may include M sub-inputs, and each sub-input is a sliding input of the user 1 in a region.

Optionally, in this embodiment of this application, the M sub-inputs may be consecutive sub-inputs or non-consecutive sub-inputs.

It should be noted that, the "consecutive sub-inputs" may be understood as a case in which a time interval between two sub-inputs is less than or equal to a preset time interval, or there is no other input between two sub-inputs.

Step 502. In response to the fifth input, the first image sharing apparatus generates M sub-images based on the M sub-regions and displays the M sub-images.

Optionally, in this embodiment of this application, in response to the fifth input, the first image sharing apparatus may respectively add M marker elements to the M sub-regions and display a second control, where the second control is used to generate a sub-image, so that the user 1 can perform a click/tap input for the second control.

Figure 8A:
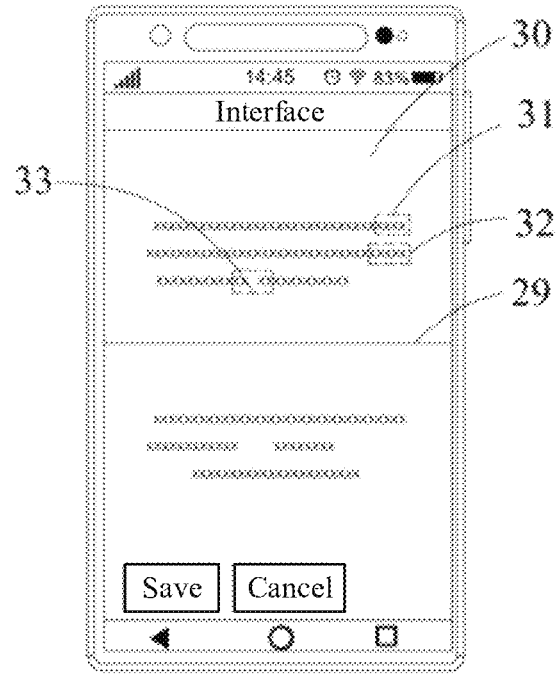
FIGS. 8A-8B are fifth example schematic diagrams of an interface of a mobile phone according to an embodiment of this application.
Figure 8B:
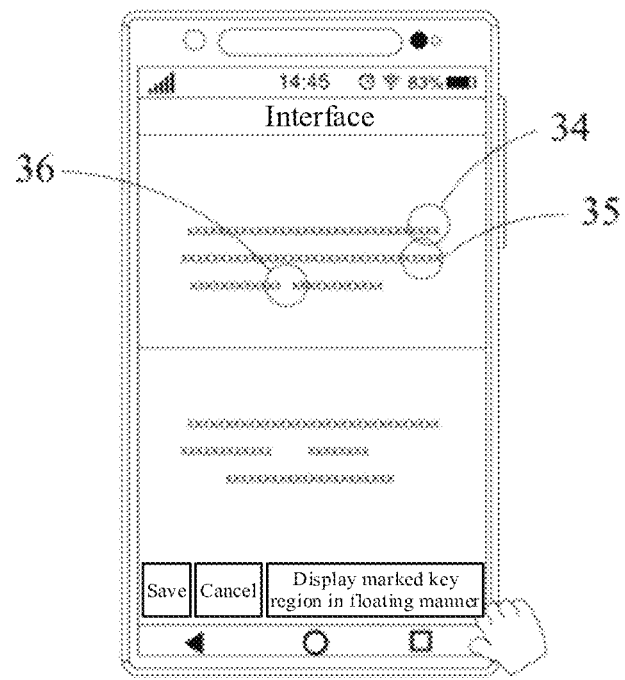

For example, as shown in FIG. 8A, a mobile phone displays a target image (for example, an image 29), and the image 29 is in an editable state, so that the user 1 can perform the fifth input for M sub-regions (for example, a region 31, a region 32, and a region 33) of the third region (for example, a first region 30). As shown in FIG. 8B, after the user 1 performs the fifth input, the mobile phone may add a marker element (for example, a marker element 34) to the region 31, add another marker element (for example, a marker element 35) to the region 32, add still another marker element (for example, a marker element 36) to the region 33, and display a second control (for example, a "Display marked key region in floating manner" control), so that the user 1 can perform a click/tap input for the "Display marked key region in floating manner" control, to enable the mobile phone to generate three sub-images.

In this embodiment of this application, each of the M sub-regions corresponds to one sub-image.

Optionally, in this embodiment of this application, after the user 1 performs the click/tap input for the second control, the first image sharing apparatus may delete the M marker elements, and generate each sub-image according to each of the M sub-regions.

Optionally, in this embodiment of this application, step 502 may be implemented through the following step 502a.

Step 502a. In response to the fifth input, the first image sharing apparatus generates M sub-images based on the M sub-regions, reduces a display size of the target image, and displays the M sub-images in a display region adjacent to a display region of the target image.

Figure 9:
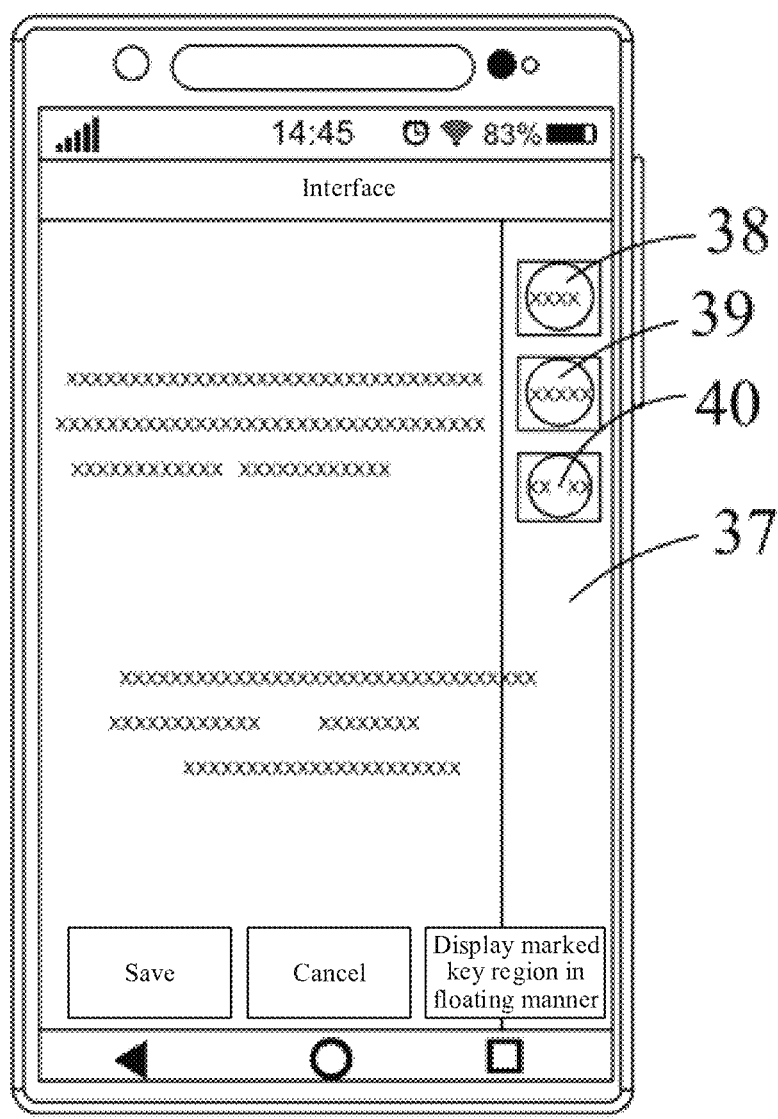
FIG. 9 is a sixth example schematic diagram of an interface of a mobile phone according to an embodiment of this application.

For example, with reference to FIG. 8B, as shown in FIG. 9, after the user 1 performs the click/tap input for the "Display marked key region in floating manner" control, the mobile phone may reduce a display size of the image 29, and display M sub-images (for example, a sub-image 38, a sub-image 39, and a sub-image 40) in a display region (for example, a region 37) adjacent to a display region of the image 29. The sub-image 38 corresponds to the sub-region 31. The sub-image 39 corresponds to the sub-region 32. The sub-image 40 corresponds to the sub-region 33.

It can be learned that, because the first image sharing apparatus can reduce the display size of the target image to display the M sub-images in the display region adjacent to the display region of the target image, a case that the M sub-images block the content in the target image can be avoided. In this way, efficiency of content sharing by the first image sharing apparatus can be improved, and therefore, user experience can be improved.

It can be learned that, because the first image sharing apparatus can display the M sub-images on the target image according to the input of the user in the M sub-regions of the third region, another contact can directly view the M sub-images to rapidly view the content that the user intends to share. Therefore, efficiency of content sharing by the first image sharing apparatus can be improved.

Optionally, in this embodiment of this application, after step 502, the image sharing method provided in this embodiment of this application may further include the following step 503 and step 504.

Step 503. The first image sharing apparatus receives a sixth input for dragging a target sub-image in the M sub-images to a target location.

Optionally, in this embodiment of this application, after the first image sharing apparatus displays the M sub-images, the first image sharing apparatus can display a third control, where the third control is used to adjust a display order of the M sub-images, so that the user 1 can perform an input for the third control, to enable the first image sharing apparatus to control the M sub-images to be in the editable state. In this way, the user 1 can perform the sixth input.

For example, with reference to FIG. 9, as shown in FIG. 10, after the mobile phone displays the sub-image 38, the sub-image 39, and the sub-image 40 in the region 37, the mobile phone can display a third control (for example, an "Adjust display order" control), so that the user can perform an input for the "Adjust display order" control, to enable the mobile phone to control the sub-image 38, the sub-image 39, and the sub-image 40 to be in the editable state. In this way, the user 1 can perform the sixth input.

Optionally, in this embodiment of this application, the sixth input may be a sliding input with a starting input location being a location of the target sub-image and an end input location being the target location.

It should be noted that, the "starting input location" may be understood as a location at which a finger of the user 1 starts to touch the display screen. The "end input location" may be understood as a location at which a finger of the user 1 leaves the display screen.

Step 504. In response to the sixth input, based on the target location, the first image sharing apparatus adjusts a display region of the target sub-image and adjusts display regions of N sub-images in the M sub-images.

In this embodiment of this application, the N sub-images are determined based on the display region of the target sub-image and the target location, and N is a positive integer.

Optionally, in this embodiment of this application, in a case that the target location at least partially overlaps a location of an i-th sub-image in the M sub-images, the N sub-images include a sub-image with a display order before the target sub-image and after the i-th sub-image; and the i-th sub-image.

For example, in this embodiment of this application, the first image sharing apparatus may adjust the display region of the target sub-image to a display region of the i-th sub-image, and adjusts the display region of the i-th sub-image to a display region of an (i+1)-th sub-image, and so on, to adjust the display regions of the N sub-images.

It can be learned that, the user can perform the sixth input for the target sub-image to enable the first image sharing apparatus to adjust the display regions of the N sub-images, to adjust a display order (logical order) of the N sub-images. Therefore, image viewing experience of the user (that is, the user or a user of another image sharing apparatus) can be improved.

It can be understood that, the user can be enabled to determine an internal logical relationship between a plurality of sub-images, so that the user experience can be improved.

An embodiment of this application provides an image sharing method, and the image sharing method can be applied to a second image sharing apparatus. FIG. 11 is a flowchart of an image sharing method according to an embodiment of this application. As shown in FIG. 11, the image sharing method provided in this embodiment of this application may include the following step 601 to step 603.

Step 601. In a case that a second image sharing apparatus displays an interface of a target group, the second image sharing apparatus receives a first input of a user for an identifier of a target image in the interface of the target group.

Optionally, in this embodiment of this application, in a case that the second image sharing apparatus displays a desktop, the second image sharing apparatus may display an interface of a target application according to a selection input (for example, a click/tap input) of a user 2 for an identifier of the target application, and the interface of the target application includes an identifier of at least one group. In this way, the first image sharing apparatus can display the interface of the target group according to a selection input (for example, a click/tap input) of the user 2 for an identifier of the target group in the identifier of the at least one group, so that the user can perform the first input.

Optionally, in this embodiment of this application, the identifier of the target image may be a thumbnail of the target image.

In this embodiment of this application, the first input is used to trigger the second image sharing apparatus to download the target image.

Optionally, in this embodiment of this application, the first input may be a click/tap input of the user for the identifier of the target image.

Figure 12:
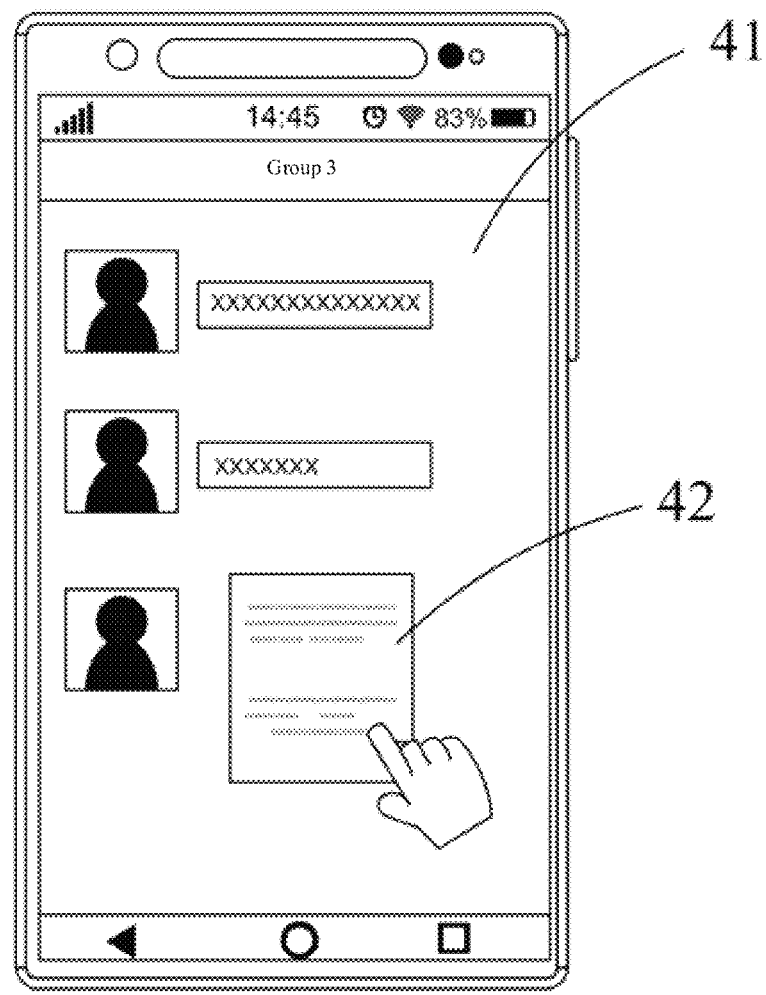
FIG. 12 is an eighth example schematic diagram of an interface of a mobile phone according to an embodiment of this application.

For example, that the second image sharing apparatus is a mobile phone is used as an example for description. As shown in FIG. 12, the mobile phone displays the interface (for example, an interface 41) of the target group, and the interface 41 includes the identifier of the target image (for example, an identifier 42), so that the user can perform the first input (for example, the click/tap input) for the identifier 42.

Step 602. The second image sharing apparatus sends an image download request to a server of the target group in response to the first input.

In this embodiment of this application, the image download request is used to request download of the target image, and the image download request includes an identifier of a target contact corresponding to the second image sharing apparatus.

Optionally, in this embodiment of this application, the identifier of the target contact may include at least one of: a user name, a user account, or the like.

Step 603. The second image sharing apparatus receives a first image sent by the server, and displays the first image.

In this embodiment of this application, the first image is an image sent by the server of the target group to the second image sharing apparatus based on the identifier of the target contact and target image data. The target image data is sent by a first image sharing apparatus to the server. The target image data includes an identifier of a first contact, an identifier of a second contact, a second image, and a third image. The second image is generated based on a first region of the target image. The third image is generated based on a second region of the target image. The identifier of the first contact corresponds to the second image. The identifier of the second contact corresponds to the third image. The first image includes any one of: the second image or the third image. The identifier of the first contact corresponds to the second image, and the identifier of the second contact corresponds to the third image. The first image includes any one of: the second image or the third image.

Optionally, in this embodiment of this application, the second image sharing apparatus may switch the interface of the target group to a second interface, where the second interface includes the first image, to display the first image.

Optionally, in this embodiment of this application, in a case that both the first contact and the second contact include a third contact, the target image data further includes a fourth image, and the first image includes any one of: the second image, the third image, or the fourth image.

In this embodiment of this application, an identifier of the third contact corresponds to the fourth image, and the fourth image is generated based on the first region and the second region.

It should be noted that, for the description of the fourth image, refer to the description in the foregoing embodiment. Details are not described herein again in this embodiment of this application.

It can be learned that, because in a case that both the first contact and the second contact includes the third contact, the second image sharing apparatus can display the fourth image, that is, the second image sharing apparatus can display an image that a user intends to share of the first image sharing apparatus, images that the second image sharing apparatus intends to share can be more diversified.

Optionally, in this embodiment of this application, the target image data further includes: the target image.

In a case that the identifier of the target contact matches the identifier of the first contact, the first image is the second image.

In a case that the identifier of the target contact matches the identifier of the second contact, the first image is the third image.

In a case that the identifier of the target contact matches the identifier of the third contact, the first image is the fourth image.

In a case that the identifier of the target contact matches neither the identifier of the first contact nor the identifier of the second contact, the first image is the target image.

Figure 13:
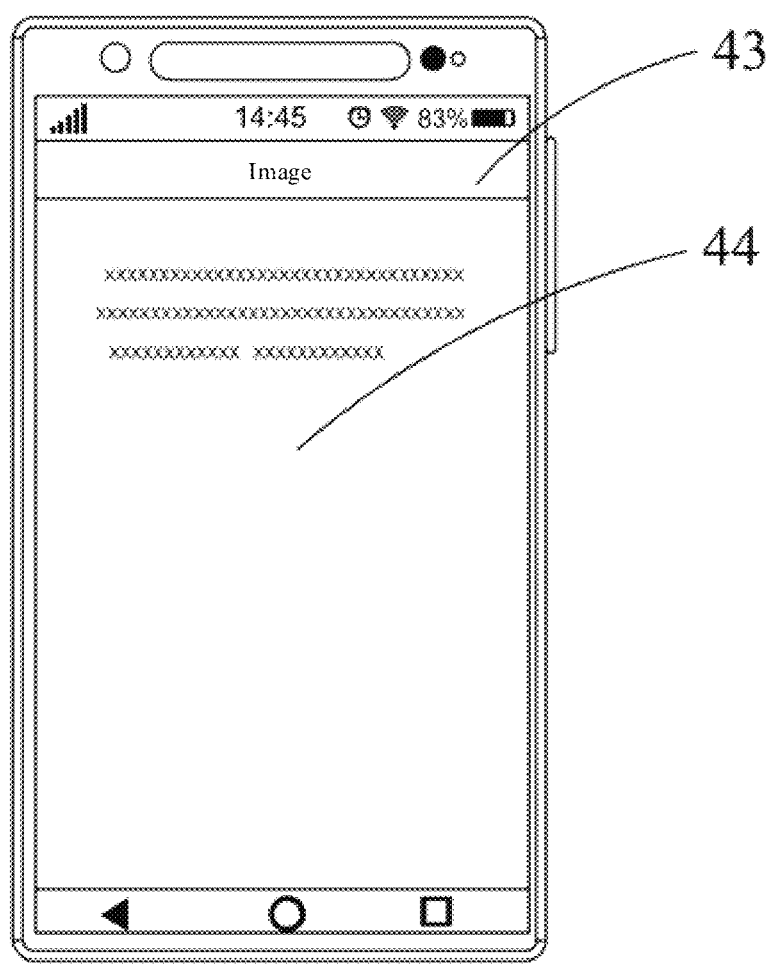
FIG. 13 is a ninth example schematic diagram of an interface of a mobile phone according to an embodiment of this application.

For example, with reference to FIG. 12, as shown in FIG. 13, after the user performs the first input, the mobile phone may send an image download request to the server, where the image download request includes the identifier of the target contact, so that in a case that the identifier of the target contact matches the identifier of the first contact, the mobile phone can switch the interface 41 to the second interface (for example, an interface 43). The interface 43 includes the second image (for example, an image 44).

Figure 14:
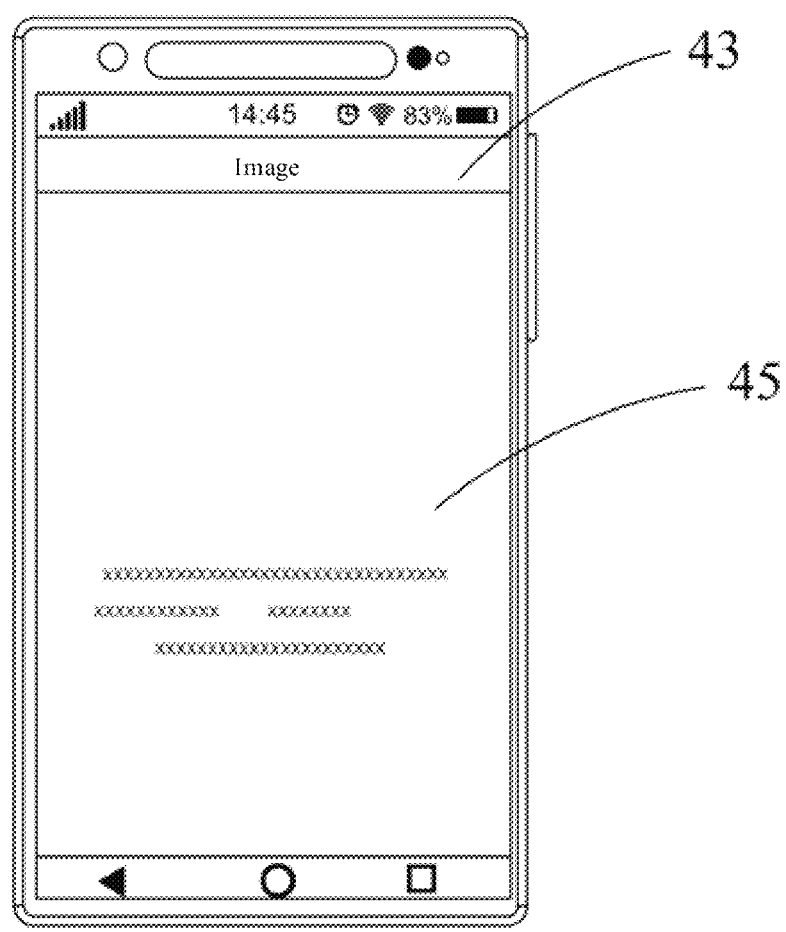
FIG. 14 is a tenth example schematic diagram of an interface of a mobile phone according to an embodiment of this application.

For example, with reference to FIG. 12, as shown in FIG. 14, after the user performs the first input, the mobile phone may send an image download request to the server, where the image download request includes the identifier of the target contact, so that in a case that the identifier of the target contact matches the identifier of the second contact, the mobile phone can switch the interface 41 to the second interface (for example, an interface 43). The interface 43 includes the third image (for example, an image 45).

Figure 15:
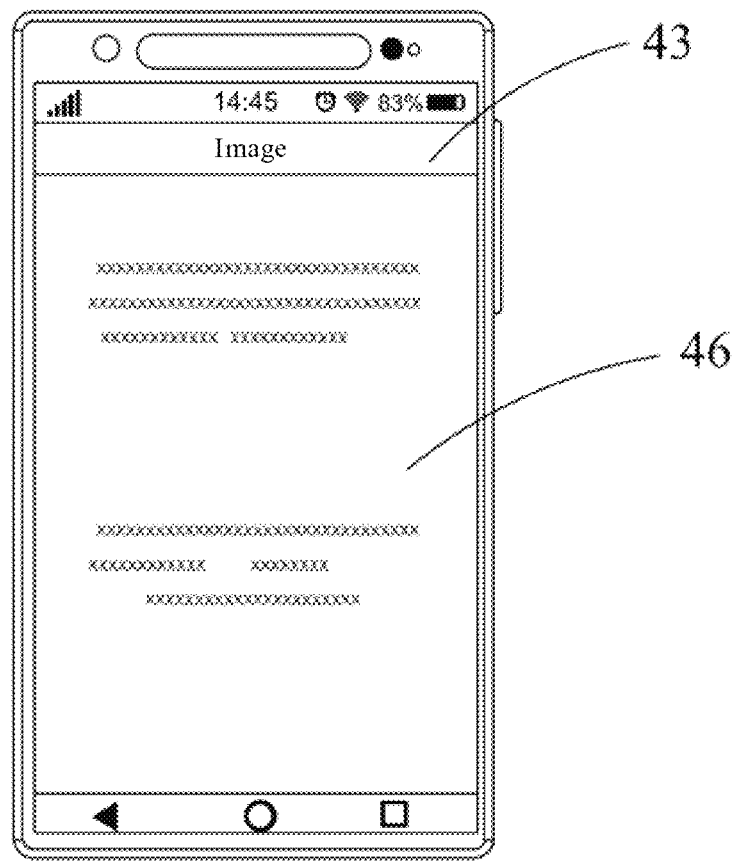
FIG. 15 is an eleventh example schematic diagram of an interface of a mobile phone according to an embodiment of this application.

For example, with reference to FIG. 12, as shown in FIG. 15, after the user performs the first input, the mobile phone may send an image download request to the server, where the image download request includes the identifier of the target contact, so that in a case that the identifier of the target contact matches neither the identifier of the first contact nor the identifier of the second contact, the mobile phone can switch the interface 41 to the second interface (for example, an interface 43). The interface 43 includes the target image (for example, an image 46).

According to the image sharing method provided in this embodiment of this application, in a case that the second image sharing apparatus displays an interface of a target group, the second image sharing apparatus may send an image download request to a server of the target group according to a first input of a user for an identifier of a target image, where the image download request includes an identifier of a target contact corresponding to the second image sharing apparatus, so that the server can send a second image or a third image in target image data to the second image sharing apparatus according to the identifier of the target contact and the target image data sent by a first image sharing apparatus to the server, to enable the second image sharing apparatus to receive and display the second image or the third image. The second image sharing apparatus can send, to the server according to the first input of the user, the image download request including the identifier of the target contact corresponding to the second image sharing apparatus. In this way, the second image sharing apparatus can receive a particular image (that is, the second image or the third image) determined by the server according to the identifier of the target contact and the target image data, and display the particular image (that is, an image including a content that a user intends to share of the first image sharing apparatus), so that the user can directly view the image including the content that the user intends to share of the first image sharing apparatus, rather than all displaying the target image, that is, the user does not need to search a relatively large quantity of contents for the content that the user intends to share. Therefore, it can take a shorter time for the user to view the content that the user intends to share of the first image sharing apparatus. In this way, contents can be more conveniently shared by the second image sharing apparatus.

It should be noted that, the image sharing method provided in this embodiment of this application may be performed by the image sharing apparatus in the foregoing embodiment, or a control module in the image sharing apparatus for performing the image sharing method. In this embodiment of this application, that the image sharing apparatus performs the image sharing method is used as an example describe an apparatus of the image sharing method provided in this embodiment of this application.

Figure 16:
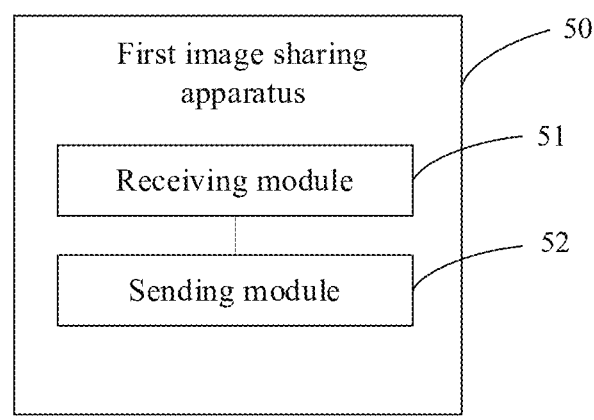
FIG. 16 is a first schematic structural diagram of an image sharing apparatus according to an embodiment of this application.

FIG. 16 is a possible schematic structural diagram of an image sharing apparatus according to an embodiment of this application. As shown in FIG. 16, a first image sharing apparatus 50 may include: a receiving module 51 and a sending module 52.

The receiving module 51 is configured to receive a seventh input for a target image. The target image includes at least a first region and a second region. The sending module 52 is configured to: in response to the seventh input received by the receiving module 51, send a second image to a first contact and send a third image to a second contact; or in response to the seventh input received by the receiving module 51, send target image data to a server of a target group in a case that a first contact and a second contact belong to the target group. The second image is generated based on the first region and the third image is generated based on the second region. The target image data includes an identifier of the first contact, an identifier of the second contact, the second image, and the third image. The identifier of the first contact corresponds to the second image. The identifier of the second contact corresponds to the third image.

In a possible implementation, in a case that both the first contact and the second contact include a third contact, the sending module 52 is configured to send the second image to the first contact, send the third image to the second contact, and send a fourth image to the third contact. The fourth image is generated based on the first region and the second region. The target image data further includes the fourth image. An identifier of the third contact corresponds to the fourth image.

In a possible implementation, the first image sharing apparatus 50 provided in this embodiment of this application may further include a processing module. The processing module is configured to associate the first region with the first contact, associate the second region with the second contact, and associate both the first region and the second region with the third contact.

In a possible implementation, the receiving module 51 is further configured to receive a second input for the target image in a case that the target image is displayed. The first image sharing apparatus 50 provided in this embodiment of this application may further include a processing module. The processing module is configured to: in response to the second input received by the receiving module 51, divide the target image into the first region and the second region according to an input parameter of the second input.

In a possible implementation, the first image sharing apparatus 50 provided in this embodiment of this application may further include a display module and a processing module. The display module is configured to display an image editing interface, where the image editing interface includes the target image. The receiving module 51 is further configured to receive a third input of a user for a target region of the target image, where the target region includes at least one of: the first region or the second region. The display module is further configured to display at least one first control in response to the third input received by the receiving module 51, where each first control corresponds to one image processing manner. The receiving module 51 is further configured to receive a fourth input of the user for a target control in the at least one first control displayed by the display module. The processing module is configured to: in response to the fourth input received by the receiving module 51, perform image processing on the target region in an image processing manner corresponding to the target control.

In a possible implementation, the target image data further includes the target image. In a case that the target region is the first region, both the second image and the fourth image are generated according to the first region after image processing. In a case that the target region is the second region, both the third image and the fourth image are generated according to the second region after image processing. The target image is an image sent to another contact, or an image displayed on an image sharing apparatus of another contact. The another contact is a contact in the target group other than the first contact and the second contact.

In a possible implementation, in a case that the target region includes the first region and the second region, the second image is generated according to the first region after image processing, the third image is generated according to the second region after image processing, and the fourth image is generated according to the first region after image processing and the second region after image processing.

In a possible implementation, the receiving module 51 is further configured to receive a fifth input for M sub-regions of a third region, where the third region is the first region or the second region, and M is a positive integer. The first image sharing apparatus 50 provided in this embodiment of this application may further include a processing module. The processing module is configured to: in response to the fifth input received by the receiving module 51, generate M sub-images based on the M sub-regions and display the M sub-images, where each sub-region corresponds to one sub-image.

In a possible implementation, the first image sharing apparatus 50 provided in this embodiment of this application may further include a display module. The display module is configured to reduce a display size of the target image, and display the M sub-images in a display region adjacent to a display region of the target image.

In a possible implementation, the receiving module 51 is further configured to receive a sixth input for dragging a target sub-image in the M sub-images to a target location. The processing module is further configured to: in response to the sixth input received by the receiving module, based on the target location, adjust a display region of the target sub-image and adjust display regions of N sub-images in the M sub-images, where N is a positive integer. The N sub-images are determined based on the display region of the target sub-image and the target location.

According to the image sharing apparatus provided in this embodiment of this application, the first image sharing apparatus can, according to the seventh input, send, to the first contact, the second image including a content that a user intends to share with the first contact, and send, to the second contact, the third image including a content that the user intends to share with the second contact; or send the target image data to the server of the target group, so that the server can, according to the target image data, send, to the first contact, the second image including the content that the user intends to share with the first contact, and send, to the second contact, the third image including the content that the user intends to share with the second contact. Therefore, the first contact (or the second contact) can directly view, from the second image (or the third image), the content that the user intends to share with the first contact (or the second contact), without searching one by one all contents in the target image for the content that the user intends to share with the first contact (or the second contact). Therefore, it can take a shorter time for each contact to view the content that the user intends to share. In this way, contents can be more conveniently shared by the first image sharing apparatus.

It should be noted that, the image sharing apparatus provided in this embodiment of this application may be configured to perform the image sharing method performed by the first image sharing apparatus in the foregoing embodiment.

The image sharing apparatus provided in this embodiment of this application can implement the processes implemented in the method embodiments of FIG. 1 to FIG. 10. To avoid repetition, details are not described herein again.

Figure 17:
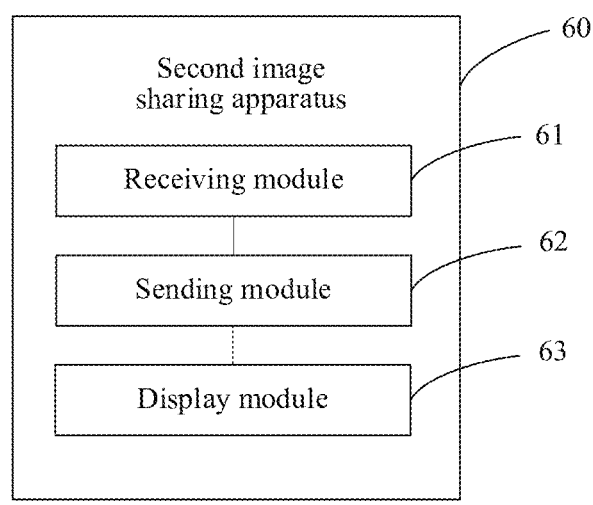
FIG. 17 is a second schematic structural diagram of an image sharing apparatus according to an embodiment of this application.

FIG. 17 is a possible schematic structural diagram of an image sharing apparatus according to an embodiment of this application. The image sharing apparatus is a second image sharing apparatus. As shown in FIG. 17, the second image sharing apparatus 60 may include a receiving module 61, a sending module 62, and a display module 63.

The receiving module 61 is configured to: in a case that an interface of a target group is displayed, receive a first input of a user for an identifier of a target image in the interface of the target group. The sending module 62 is configured to: in response to the first input received by the receiving module 61, send an image download request to a server of the target group. The image download request is used to request download of the target image. The image download request includes an identifier of a target contact corresponding to the second image sharing apparatus. The receiving module 61 is further configured to receive a first image sent by the server. The display module 63 is configured to display the first image received by the receiving module 61. The first image is an image sent by the server to the second image sharing apparatus based on the identifier of the target contact and target image data. The target image data is sent by a first image sharing apparatus to the server. The target image data includes an identifier of a first contact, an identifier of a second contact, a second image, and a third image. The second image is generated based on a first region of the target image. The third image is generated based on a second region of the target image. The identifier of the first contact corresponds to the second image, and the identifier of the second contact corresponds to the third image. The first image includes any one of: the second image or the third image.

In a possible implementation, in a case that both the first contact and the second contact include a third contact, the target image data further includes a fourth image, and the first image includes any one of: the second image, the third image, or the fourth image. An identifier of the third contact corresponds to the fourth image, and the fourth image is generated based on the first region and the second region.

In a possible implementation, the target image data further includes the target image. In a case that the identifier of the target contact matches the identifier of the first contact, the first image is the second image. In a case that the identifier of the target contact matches the identifier of the second contact, the first image is the third image. In a case that the identifier of the target contact matches the identifier of the third contact, the first image is the fourth image. In a case that the identifier of the target contact matches neither the identifier of the first contact nor the identifier of the second contact, the first image is the target image.

According to the image sharing apparatus provided in this embodiment of this application, the second image sharing apparatus can send, to the server according to the first input of the user, the image download request including the identifier of the target contact corresponding to the second image sharing apparatus. In this way, the second image sharing apparatus can receive a particular image (that is, the second image or the third image) determined by the server according to the identifier of the target contact and the target image data, and display the particular image (that is, an image including a content that a user intends to share of the first image sharing apparatus), so that the user can directly view the image including the content that the user intends to share of the first image sharing apparatus, rather than all displaying the target image, that is, the user does not need to search a relatively large quantity of contents for the content that the user intends to share. Therefore, it can take a shorter time for the user to view the content that the user intends to share of the first image sharing apparatus. In this way, contents can be more conveniently shared by the second image sharing apparatus.

It should be noted that, the image sharing apparatus provided in this embodiment of this application may be configured to perform the image sharing method performed by the second image sharing apparatus in the foregoing embodiment.

The image sharing apparatus provided in this embodiment of this application can implement the processes implemented in the method embodiments of FIG. 11 to FIG. 15. To avoid repetition, details are not described herein again.

The image sharing apparatus in the foregoing embodiment may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached memory (NAS), a personal computer (PC), a television (TV), a teller machine, or an automated machine, which are not limited in the embodiments of this application.

The image sharing apparatus in the foregoing embodiment may be an apparatus with an operating system. The operating system may be an Android operating system, an iOS operating system, or other possible operating systems, which is not limited in the embodiments of this application.

Figure 18:
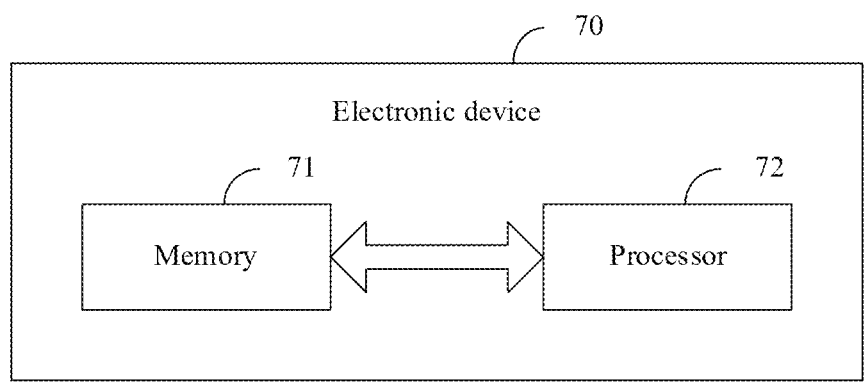
FIG. 18 is a schematic structural diagram of an electronic device according to an embodiment of this application.

Optionally, as shown in FIG. 18, an embodiment of this application further provides an electronic device 70, including a processor 72, a memory 71, and a program or an instruction stored in the memory 71 and executable on the processor 72. When the program or the instruction is executed by the processor 72, the processes of the embodiment of the image sharing method are implemented, and the same technical effects can be achieved. To avoid repetition, details are not described herein again.

It should be noted that, the electronic device in this embodiment of this application includes the mobile electronic device and the non-mobile electronic device described above.

Figure 19:
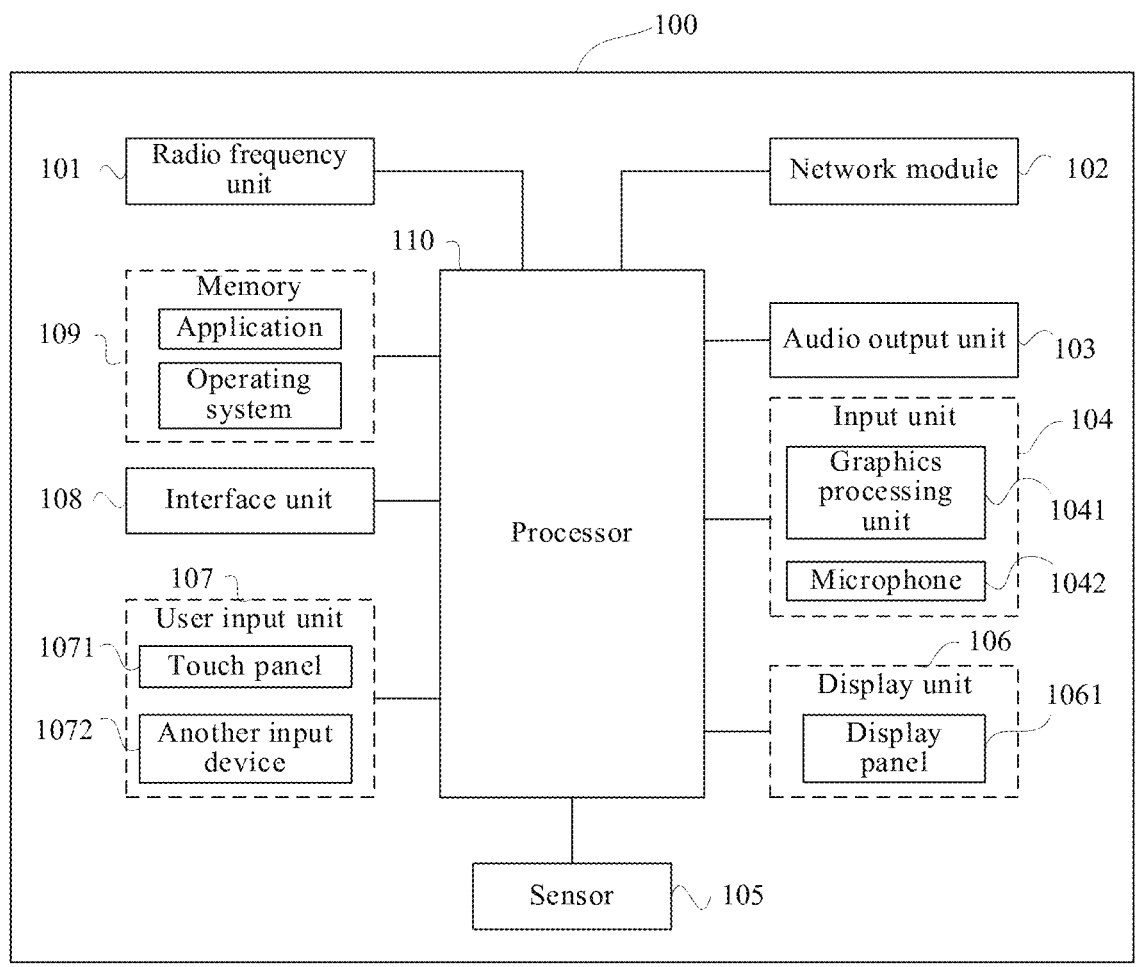
FIG. 19 is a schematic hardware diagram of an electronic device according to an embodiment of this application.

FIG. 19 is a schematic diagram of a hardware structure of an electronic device for implementing an embodiment of this application. The electronic device is a second electronic device.

The electronic device 100 includes, but is not limited to: a radio frequency unit 101, a network module 102, an audio output unit 103, an input unit 104, a sensor 105, a display unit 106, a user input unit 107, an interface unit 108, a memory 109, a processor 110, and other components.

A person skilled in the art may understand that, the electronic device 100 may further include a power supply (such as a battery) for supplying power to each component. The power supply may be logically connected to the processor 110 by using a power management system, thereby implementing functions, such as charging, discharging, and power consumption management, by using the power management system. The structure of the electronic device shown in FIG. 19 constitutes no limitation on the electronic device, and the electronic device may include more or fewer components than those shown in the figure, or some components may be combined, or a different component deployment may be used. Details are not described herein again.

The user input unit 107 is configured to receive a seventh input for a target image.

The radio frequency unit 101 is configured to: in response to the seventh input, send a second image to a first contact and send a third image to a second contact; or in response to the seventh input, send target image data to a server of a target group in a case that a first contact and a second contact belong to the target group.

The second image is generated based on the first region and the third image is generated based on the second region. The target image data includes an identifier of the first contact, an identifier of the second contact, the second image, and the third image. The identifier of the first contact corresponds to the second image. The identifier of the second contact corresponds to the third image.

According to the electronic device provided in this embodiment of this application, the electronic device is a second electronic device. The second electronic device can, according to the seventh input, send, to the first contact, the second image including a content that a user intends to share with the first contact, and send, to the second contact, the third image including a content that the user intends to share with the second contact; or send the target image data to the server of the target group, so that the server can, according to the target image data, send, to the first contact, the second image including the content that the user intends to share with the first contact, and send, to the second contact, the third image including the content that the user intends to share with the second contact. Therefore, the first contact (or the second contact) can directly view, from the second image (or the third image), the content that the user intends to share with the first contact (or the second contact), without searching one by one all contents in the target image for the content that the user intends to share with the first contact (or the second contact). Therefore, it can take a shorter time for each contact to view the content that the user intends to share. In this way, contents can be more conveniently shared by the second electronic device.

Optionally, in this embodiment of this application, the radio frequency unit 101 is configured to send the second image to the first contact, send the third image to the second contact, and send a fourth image to the third contact.

The fourth image is generated based on the first region and the second region. The target image data further includes the fourth image. An identifier of the third contact corresponds to the fourth image.

It can be learned that, because in a case that both the first contact and the second contact include the third contact, the second electronic device can send the second image to the first contact, send the third image to the second contact, and send the fourth image to the third contact, that is, the second electronic device can send different images to different contacts according to different sharing requirements of users, images that the second electronic device intends to share can be more diversified.

Optionally, in this embodiment of this application, the processor 110 is configured to associate the first region with the first contact, associate the second region with the second contact, and associate both the first region and the second region with the third contact.

It can be learned that, because the second electronic device can associate the first region with the first contact, associate the second region with the second contact, and associate both the first region and the second region with the third contact, the second electronic device can send different images to different contacts according to different sharing requirements of users. Therefore, images that the second electronic device intends to share can be more diversified, thereby improving user experience.

Optionally, in this embodiment of this application, the user input unit 107 is further configured to receive a second input for the target image in a case that the target image is displayed.

The processor 110 is further configured to: in response to the second input, divide the target image into the first region and the second region according to an input parameter of the second input.

It can be learned that, because the second electronic device can divide, according to an input of the user, the target image into different regions including different contents, to enable the second electronic device to generate, according to the different regions, different images including different contents and required by the user, to accurately send, to different contacts, the different images including different contents and required by the user, accuracy of the second electronic device in sharing the content that the user intends to share can be improved.

Optionally, in this embodiment of this application, the display unit 106 is configured to display an image editing interface, where the image editing interface includes the target image.

The user input unit 107 is further configured to receive a third input of a user for a target region of the target image, where the target region includes at least one of: the first region or the second region.

The display unit 106 is further configured to display at least one first control in response to the third input, where each first control corresponds to one image processing manner.

The user input unit 107 is further configured to receive a fourth input of the user for a target control in the at least one first control.

The processor 110 is further configured to: in response to the fourth input, perform image processing on the target region in an image processing manner corresponding to the target control.

It can be learned that, because the second electronic device can display at least one first control according to the third input of the user for the target region in a case that the image editing interface is displayed, and perform, according to the fourth input of the user for the target control, image processing on the target region in the image processing manner corresponding to the target control, the user can share, with some contacts in the target group, contents obtained after the image processing. Therefore, a display effect of the content shared by the second electronic device can be improved, thereby improving user experience.

Optionally, in this embodiment of this application, the user input unit 107 is further configured to receive a fifth input for M sub-regions of a third region, where the third region is the first region or the second region, and M is a positive integer.

The processor 110 is further configured to: in response to the fifth input, generate M sub-images based on the M sub-regions.

The display unit 106 is further configured to display the M sub-images, where each sub-region corresponds to one sub-image.

It can be learned that, because the second electronic device can display the M sub-images on the target image according to the input of the user in the M sub-regions of the third region, another contact can directly view the M sub-images to rapidly view the content that the user intends to share. Therefore, efficiency of content sharing by the second electronic device can be improved.

Optionally, in this embodiment of this application, the display unit 106 is configured to reduce a display size of the target image, and display the M sub-images in a display region adjacent to a display region of the target image.

It can be learned that, because the second electronic device can reduce the display size of the target image to display the M sub-images in the display region adjacent to the display region of the target image, a case that the M sub-images block the content in the target image can be avoided. In this way, efficiency of content sharing by the second electronic device can be improved, and therefore, user experience can be improved.

Optionally, in this embodiment of this application, the user input unit 107 is further configured to receive a sixth input for dragging a target sub-image in the M sub-images to a target location.

The processor 110 is further configured to: in response to the sixth input, based on the target location, adjust a display region of the target sub-image and adjust display regions of N sub-images in the M sub-images, where N is a positive integer.

The N sub-images are determined based on the display region of the target sub-image and the target location.

It can be learned that, the user can perform the sixth input for the target sub-image to enable the second electronic device to adjust the display regions of the N sub-images, to adjust a display order (logical order) of the N sub-images. Therefore, image viewing experience of the user (that is, the user or a user of another electronic device) can be improved.

It should be noted that, the electronic device provided in this embodiment of this application may be configured to perform the image sharing method performed by the first image sharing apparatus in the foregoing embodiment.

FIG. 19 is a schematic diagram of a hardware structure of an electronic device for implementing an embodiment of this application. The electronic device is a first electronic device.

The electronic device 100 includes, but is not limited to: a radio frequency unit 101, a network module 102, an audio output unit 103, an input unit 104, a sensor 105, a display unit 106, a user input unit 107, an interface unit 108, a memory 109, a processor 110, and other components.

A person skilled in the art may understand that, the electronic device 100 may further include a power supply (such as a battery) for supplying power to each component. The power supply may be logically connected to the processor 110 by using a power management system, thereby implementing functions, such as charging, discharging, and power consumption management, by using the power management system. The structure of the electronic device shown in FIG. 19 constitutes no limitation on the electronic device, and the electronic device may include more or fewer components than those shown in the figure, or some components may be combined, or a different component deployment may be used. Details are not described herein again.

The user input unit 107 is configured to: in a case that an interface of a target group is displayed, receive a first input for an identifier of a target image in the interface of the target group.

The radio frequency unit 101 is configured to: in response to the first input, send an image download request to a server of the target group, where the image download request is used to request download of the target image, and the image download request includes an identifier of a target contact corresponding to the first electronic device; and receive a first image sent by the server.

The display unit 106 is configured to display the first image.

The first image is an image sent by the server to the first electronic device based on the identifier of the target contact and target image data. The target image data is sent by a second electronic device to the server. The target image data includes an identifier of a first contact, an identifier of a second contact, a second image, and a third image. The second image is generated based on a first region of the target image. The third image is generated based on a second region of the target image. The identifier of the first contact corresponds to the second image, and the identifier of the second contact corresponds to the third image. The first image includes any one of: the second image or the third image.

According to the electronic device provided in this embodiment of this application, the first electronic device can send, to the server according to the first input of the user, the image download request including the identifier of the target contact corresponding to the first electronic device. In this way, the first electronic device can receive a particular image (that is, the second image or the third image) determined by the server according to the identifier of the target contact and the target image data, and display the particular image (that is, an image including a content that a user intends to share of the second electronic device), so that the user can directly view the image including the content that the user intends to share of the second electronic device, rather than all displaying the target image, that is, the user does not need to search a relatively large quantity of contents for the content that the user intends to share. Therefore, it can take a shorter time for the user to view the content that the user intends to share of the second electronic device. In this way, contents can be more conveniently shared by the first electronic device.

It should be noted that, the electronic device provided in this embodiment of this application may be configured to perform the image sharing method performed by the first electronic device in the foregoing embodiment.

It should be understood that, in the foregoing embodiment, the input unit 104 may include a graphics processing unit (GPU) 1041 and a microphone 1042. The graphics processing unit 1041 processes image data from static pictures or videos captured by an image capture apparatus (such as a camera) in a video capture mode or an image capture mode. The display unit 106 may include a display panel 1061, and the display panel 1061 may be configured by using a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include, but is not limited to, a physical keyboard, a functional button (such as a sound volume control button or a power button), a trackball, a mouse, or a joystick. Details are not described herein. The memory 109 may be configured to store a software program and various data, including, but not limited to, an application and an operating system. The processor 110 may integrate an application processor and a modem processor. The application processor mainly processes an operating system, a user interface, an application, and the like. The modem processor mainly processes wireless communication. It may be understood that, the modem processor may alternatively not be integrated into the processor 110.

An embodiment of this application further provides a non-transitory computer-readable storage medium, storing a program or an instruction, where when the program or the instruction is executed by a processor, the processes of the embodiment of the foregoing image sharing method are implemented, and the same technical effects can be achieved. To avoid repetition, details are not described herein again.

The processor may be the processor in the electronic device described in the foregoing embodiment. The non-transitory computer-readable storage medium includes a computer read-only memory (ROM), a random access memory (RAM), a magnetic disk, or an optical disc.

An embodiment of this application further provides a chip, including a processor and a communication interface, where the communication interface is coupled to the processor, and the processor is configured to execute a program or an instruction to implement the processes of the embodiment of the foregoing image sharing method, and the same technical effects can be achieved. To avoid repetition, details are not described herein again.

It should be understood that, the chip mentioned in this embodiment of this application may also be referred to as a system on a chip, a system chip, a chip system, a system-on-chip, or the like.

It should be noted that, the term "include", "comprise", or any other variation thereof in this specification is intended to cover a non-exclusive inclusion, so that a process, method, article, or device including a series of elements includes not only those elements but also other elements not explicitly listed, or elements inherent to such a process, method, article, or device. Without more restrictions, the elements defined by the sentence "including a . . . " do not exclude the existence of other identical elements in the process, method, article, or device including the elements. In addition, it should be noted that, the scope of the methods and apparatuses in the implementations of this application is not limited to performing the functions in the order shown or discussed, but may further include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions in the foregoing implementations, a person skilled in the art may clearly learn that the method according to the foregoing embodiment may be implemented by software plus a necessary universal hardware platform, or by using hardware. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

The embodiments of this application have been described above with reference to the accompanying drawings, but this application is not limited to the foregoing implementations. The foregoing implementations are only illustrative and not restrictive. Under the inspiration of this application, without departing from the purpose of this application and the scope of protection of the claims, a person of ordinary skill in the art can still make many forms, which all fall within the protection of this application.

What is claimed is:

1. An image sharing method, applied to a first electronic device, wherein the method comprises:
   in a case that an interface of a target group is displayed, receiving a first input for an identifier of a target image in the interface of the target group;
   in response to the first input, sending an image download request to a server of the target group, to request downloading a region of the target image, wherein the image download request comprises an identifier of a target contact corresponding to the first electronic device; and in response to the image download request, receiving a first image sent by the server, and displaying the first image, wherein the first image is an image sent by the server to the first electronic device based on the identifier of the target contact and target image data; the target image data is sent by a second electronic device to the server, the target image data comprises an identifier of a first contact, an identifier of a second contact, a second image, and a third image, the second image is generated based on a first region of the target image, and the third image is generated based on a second region of the target image; and the identifier of the first contact corresponds to the second image, and the identifier of the second contact corresponds to the third image; and the first image comprises any one of: the second image or the third image; wherein in a case that the identifier of the target contact matches the identifier of the first contact, the first image is the second image;

in a case that the identifier of the target contact matches the identifier of the second contact, the first image is the third image;

wherein the first contact and the second contact belong to the target group.

2. The method according to claim 1, wherein in a case that both the first contact and the second contact comprise a third contact, the target image data further comprises: a fourth image, and the first image comprises any one of: the second image, the third image, or the fourth image; and an identifier of the third contact corresponds to the fourth image, and the fourth image is generated based on the first region and the second region.

3. The method according to claim 2, wherein the target image data further comprises: the target image;

in a case that the identifier of the target contact matches the identifier of the third contact, the first image is the fourth image; and in a case that the identifier of the target contact matches neither the identifier of the first contact nor the identifier of the second contact, the first image is the target image.

4. An electronic device, being a first electronic device, comprising a processor, a memory, and a program or an instruction stored in the memory and executable on the processor, wherein the program or the instruction, when executed by the processor, causes the first electronic device to perform:

in a case that an interface of a target group is displayed, receiving a first input for an identifier of a target image in the interface of the target group;

in response to the first input, sending an image download request to a server of the target group, to request downloading a region of the target image, wherein the image download request comprises an identifier of a target contact corresponding to the first electronic device; and in response to the image download request, receiving a first image sent by the server, and displaying the first image, wherein the first image is an image sent by the server to the first electronic device based on the identifier of the target contact and target image data; the target image data is sent by a second electronic device to the server, the target image data comprises an identifier of a first contact, an identifier of a second contact, a second image, and a third image, the second image is generated based on a first region of the target image, and the third image is generated based on a second region of the target image; and the identifier of the first contact corresponds to the second image, and the identifier of the second contact corresponds to the third image; and the first image comprises any one of: the second image or the third image; wherein in a case that the identifier of the target contact matches the identifier of the first contact, the first image is the second image;

in a case that the identifier of the target contact matches the identifier of the second contact, the first image is the third image;

wherein the first contact and the second contact belong to the target group.

5. The electronic device according to claim 4, wherein in a case that both the first contact and the second contact comprise a third contact, the target image data further comprises: a fourth image, and the first image comprises any one of: the second image, the third image, or the fourth image; and an identifier of the third contact corresponds to the fourth image, and the fourth image is generated based on the first region and the second region.

6. The electronic device according to claim 5, wherein the target image data further comprises: the target image;

in a case that the identifier of the target contact matches the identifier of the third contact, the first image is the fourth image; and in a case that the identifier of the target contact matches neither the identifier of the first contact nor the identifier of the second contact, the first image is the target image.

7. A non-transitory computer-readable storage medium, storing a program or an instruction, wherein the program or the instruction, when executed by a processor of a first electronic device, causes the first electronic device to perform:

in a case that an interface of a target group is displayed, receiving a first input for an identifier of a target image in the interface of the target group;

in response to the first input, sending an image download request to a server of the target group, to request downloading a region of the target image, and wherein the image download request comprises an identifier of a target contact corresponding to the first electronic device; and in response to the image download request, receiving a first image sent by the server, and displaying the first image, wherein the first image is an image sent by the server to the first electronic device based on the identifier of the target contact and target image data; the target image data is sent by a second electronic device to the server, the target image data comprises an identifier of a first contact, an identifier of a second contact, a second image, and a third image, the second image is generated based on a first region of the target image, and the third image is generated based on a second region of the target image; and the identifier of the first contact corresponds to the second image, and the identifier of the second contact corresponds to the third image; and the first image comprises any one of: the second image or the third image; wherein in a case that the identifier of the target contact matches the identifier of the first contact, the first image is the second image;

in a case that the identifier of the target contact matches the identifier of the second contact, the first image is the third image;

wherein the first contact and the second contact belong to the target group.

8. The non-transitory computer-readable storage medium according to claim 7, wherein in a case that both the first contact and the second contact comprise a third contact, the target image data further comprises: a fourth image, and the first image comprises any one of: the second image, the third image, or the fourth image; and an identifier of the third contact corresponds to the fourth image, and the fourth image is generated based on the first region and the second region.

9. The non-transitory computer-readable storage medium according to claim 8, wherein the target image data further comprises: the target image;

in a case that the identifier of the target contact matches the identifier of the third contact, the first image is the fourth image; and in a case that the identifier of the target contact matches neither the identifier of the first contact nor the identifier of the second contact, the first image is the target image.

\* \* \* \* \*